US012798754B2

(12) United States Patent
Smith et al.

(10) Patent No.: US 12,798,754 B2
(45) Date of Patent: Nov. 17, 2026

(54) CUT-OUT PROCESSES FOR MOVING-LINE STRUCTURE ASSEMBLY

(71) Applicant: The Boeing Company, Arlington, VA (US)

(72) Inventors: Daniel R. Smith, Woodinville, WA (US); Darrell D. Jones, Mill Creek, WA (US); Monte D. Wright, Kenmore, WA (US)

(73) Assignee: The Boeing Company, Arlington, VA (US)

( * ) Notice: Subject to any disclaimer, the term of this patent is extended or adjusted under 35 U.S.C. 154(b) by 179 days.

(21) Appl. No.: 18/936,037

(22) Filed: Nov. 4, 2024

(65) Prior Publication Data

US 2025/0058489 A1 Feb. 20, 2025

Related U.S. Application Data

(62) Division of application No. 17/454,255, filed on Nov. 10, 2021, now Pat. No. 12,194,651.

(Continued)

(51) Int. Cl.

*B64F 5/10* (2017.01)
*B26D 7/32* (2006.01)
*B64C 1/06* (2006.01)
*B64C 1/14* (2006.01)

(Continued)

(52) U.S. Cl.

CPC ................ *B64C 1/068* (2013.01); *B26D 7/32* (2013.01); *B64C 1/14* (2013.01); *B64F 5/10* (2017.01)

(58) Field of Classification Search

CPC .. B64C 1/068; B64C 1/14; B64F 5/10; B26D 7/32

See application file for complete search history.

(56) References Cited

U.S. PATENT DOCUMENTS

2004/0217497 A1 11/2004 Engwall et al.
2008/0300823 A1 12/2008 Marsh et al.

(Continued)

FOREIGN PATENT DOCUMENTS

CN 105163901 A 12/2015
CN 106738806 A 5/2017

(Continued)

OTHER PUBLICATIONS

China National Intellectual Property Administration, Decision of Rejection and English Translation, dated Apr. 20, 2026, regarding Application No. CN202111351278.X, 17 pages.

(Continued)

*Primary Examiner* — Nirvana Deonauth

(74) *Attorney, Agent, or Firm* — Yee & Associates, P.C.

(57) ABSTRACT

Apparatus and methods are provided for fabrication of a structure, for example, a half barrel section of a fuselage. The apparatus includes an indexing unit dimensioned for coupling to an indexing feature disposed on the structure. The structure proceeds along a process direction during fabrication. A cutting station cuts out manufacturing excess from the structure to form, for example, openings for windows and doors. A method for fabrication of a structure includes indexing a structure to a cutting station based on an indexing feature associated or located on the structure. The method includes operating the cutting station to cut manufacturing excess from the structure. A method includes removing cut sections of the manufacturing excess and routing these sections away from the cutting station.

20 Claims, 14 Drawing Sheets

Related U.S. Application Data

(60) Provisional application No. 63/115,039, filed on Nov. 18, 2020.

(56) References Cited

U.S. PATENT DOCUMENTS

| | | | | |
|---|---|---|---|---|
| 2015/0198432 | A1* | 7/2015 | Clark | G05B 19/402 700/186 |
| 2022/0152860 | A1 | 5/2022 | Smith et al. | |

FOREIGN PATENT DOCUMENTS

| | | | |
|---|---|---|---|
| CN | 108405996 | A | 8/2018 |
| EP | 3170644 | A2 | 5/2017 |
| JP | H044937 | A | 1/1992 |
| JP | 2020121400 | A | 8/2020 |
| WO | 2006001860 | A2 | 1/2006 |
| WO | 2017134899 | A1 | 8/2017 |

OTHER PUBLICATIONS

China National Intellectual Property Administration, Second Notification of Office Action and English Translation, dated Jan. 31, 2026, regarding Application No. CN202111351278.X, 22 pages.

China National Intellectual Property Administration, First Notification of Office Action and English Translation, dated Jul. 16, 2025, regarding Application No. CN202111351278.X, 22 pages.

European Patent Office Extended Search Report, dated Apr. 4, 2022, regarding Application No. EP21207354.8, 11 pages.

Final Office Action, dated May 9, 2024, regarding U.S. Appl. No. 17/454,255, 18 pages.

Netherlands Patent Office Written Opinion and Search Report with English Translation, dated Oct. 28, 2021, regarding Application No. NL2028118, 13 pages.

Notice of Allowance, dated Aug. 20, 2024, regarding U.S. Appl. No. 17/454,255, 17 pages.

Office Action, dated Nov. 24, 2023, regarding U.S. Appl. No. 17/454,255, 23 pages.

Japan Patent Office First Notification of Office Action and English Translation, dated Jul. 16, 2025, regarding Application No. JP202111351278.X, 22 pages.

Japan Patent Office Notice of Reasons for Refusal and English Translation, dated Sep. 29, 2025, regarding Application No. 2021-183221, 11 pages.

Japan Patent Office Notice of Reasons for Refusal and English Translation, dated Feb. 9, 2026, regarding Application No. JP2021-183221, 22 pages.

* cited by examiner

Fig. 1C-C

CUT-OUT PROCESSES FOR MOVING-LINE STRUCTURE ASSEMBLY

CROSS-REFERENCE TO RELATED APPLICATION

This application is a Divisional application of U.S. patent application Ser. No. 17/454,255, filed Nov. 10, 2021, which claims the benefit of U.S. Provisional Patent Application Ser. No. 63/115,039, filed Nov. 18, 2020, both of which are incorporated herein by reference in their entirety.

FIELD

The disclosure relates to the field of aircraft, and in particular, to fabrication of aircraft.

BACKGROUND

Large composite parts, such as those spanning tens of feet, occupy substantial space within a factory floor. For example, a single section of fuselage for an aircraft may occupy forty linear feet or more. Such composite parts often require a variety of complex tasks to be performed upon them, such as cut-out operations, frame installation, inspection, edge sealing, painting, and other operations. To receive work for new tasks, the composite part is transported to a new cell on the factory floor, affixed in place, and indexed. Tasks such as cutting out windows or doors required bringing tools and technicians to the site where cutting out the windows and doors is needed. The removed material necessitates post trimming collection and disposal which does not add value to the manufacturing process. However, tasks such as cutting out windows or doors may require the installation of braces or other components in order to replace the stiffness of the removed structure and ensure a desired amount of loft is enforced at the fuselage section. This occupies a substantial amount of time and resources.

Therefore, it would be desirable to have a method and apparatus that take into account at least some of the issues discussed above, as well as other possible issues.

SUMMARY

Embodiments described herein provide for integrated cut-out stations that are utilized during continuous-line assembly for composite parts. This enables all windows in a fuselage, for example, to be rapidly and precisely cut-out by multiple machines as the fuselage proceeds through a continuous line. The same would be true for the aircraft's doors. During these processes, multiple sections of fuselage may proceed in series, in order to receive work from stations arranged in series at a track.

One embodiment is an apparatus for fabrication of a structure, for example, a half barrel section of a fuselage, which includes an indexing unit dimensioned for coupling to an indexing feature disposed on the structure. The structure proceeds along a process direction during fabrication where it reaches a cutting station disposed at a predetermined offset from the indexing unit. The cutting station cuts out manufacturing excess from the structure to form, for example, openings for windows and doors. The indexing unit is utilized to physically couple with a feature in a surface of the structure. In further embodiments, coupling comprises aligning the indexing unit with a feature of the structure. In further embodiments, the feature comprises a Radio Frequency Identifier (RFID) chip associated with the structure, and coupling comprises reading the RFID chip. In one embodiment, the indexing unit indexes to a section of window manufacturing excess prior to a cutter cutting the manufacturing excess material.

In another embodiment, a method for fabrication of a structure includes indexing a structure to a cutting station based on an indexing feature associated or located on the structure. The method includes operating the cutting station to cut manufacturing excess from the structure. The structure is then advanced in a process direction. In one particular embodiment, the method includes operating the cutting station to cut manufacturing excess from the structure which results in an opening, or openings, being formed in the structure. These openings are used for placement of windows or doors on the structure. In other embodiments, a gripper is coupled to the manufacturing excess before the manufacturing excess is cut from the structure. The gripper can be used to hold manufacturing excess while it is being cut from the structure and can be articulated to route or dispose of the cut manufacturing excess from the cutting station.

Other illustrative embodiments (e.g., methods and apparatus relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 1B-B is an illustration of a full barrel section of a fuselage of an aircraft in an illustrative embodiment.

FIG. 1C-C is an illustration of a frame pitch of a half barrel section in an illustrative embodiment.

FIG. 1A is a block diagram of an assembly line in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The structures described herein may comprise composite parts or metal parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as “prepreg.” Other types of carbon fiber include “dry fiber” which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
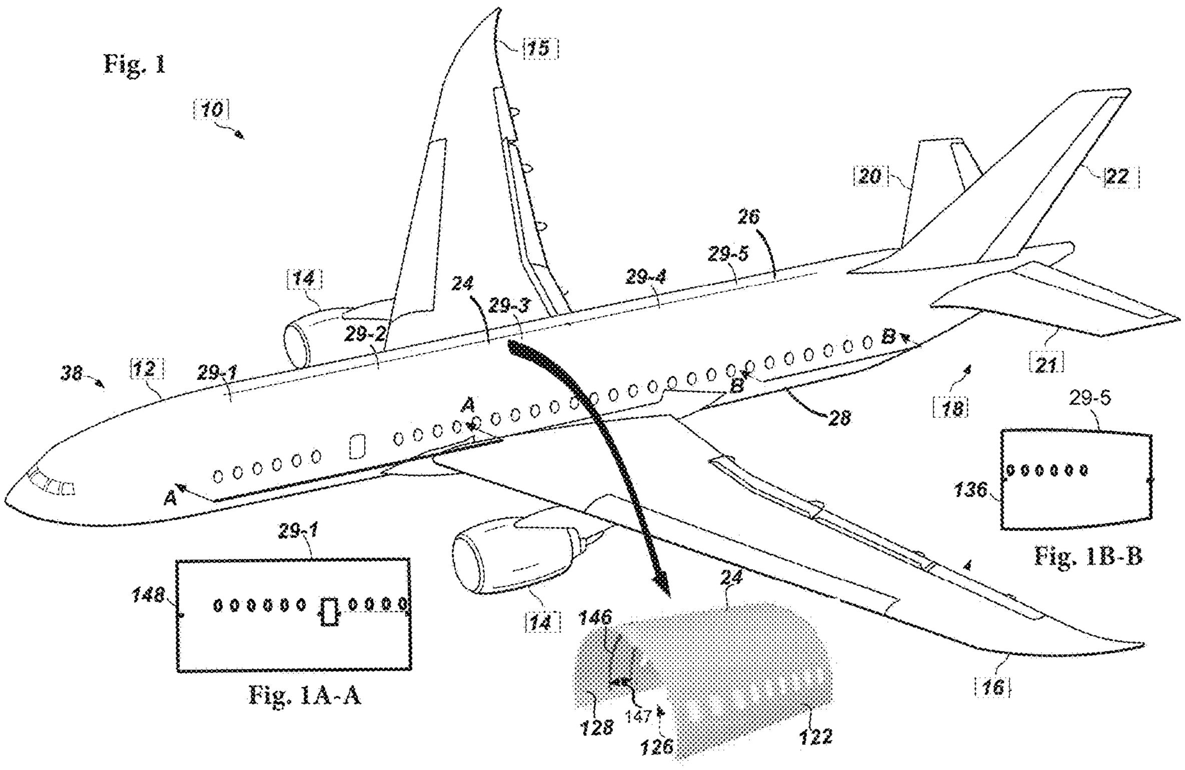
FIG. 1 is an illustration of an aircraft in which an illustrative embodiment may be implemented.

Turning now to FIG. 1, an illustration of an aircraft in which an illustrative embodiment may be implemented. Aircraft 10 is an example of an aircraft which can be formed in half barrel sections of FIG. 1A, respectively. Aircraft 10 is an example of an aircraft 10 which is formed of half barrel section 24 of fuselage 12.

In this illustrative example, aircraft 10 has wing 15 and wing 16 attached to body 28. Aircraft 10 includes engine 14 attached to wing 15 and engine 14 attached to wing 16.

Body 28 has tail section 18 and a nose section 38. Horizontal stabilizer 20, horizontal stabilizer 21, and vertical stabilizer 22 are attached to tail section 18 of body 28.

Fuselage 12 is fabricated from half barrel sections 24 with an upper half barrel section 126 joined to a lower half barrel section to form a full barrel section 29-1, 29-2, 29-3, 29-4, 29-5. The full barrel section 29-1, 29-2 corresponds to FIG. 1A-A and full barrel section 29-5 corresponds to FIG. 1B-B and are serially fastened into fuselage 12.

Wing 15 and wing 16 are formed of wing panels comprising an upper wing panel and a lower wing panel joined together.

Figure 1A:
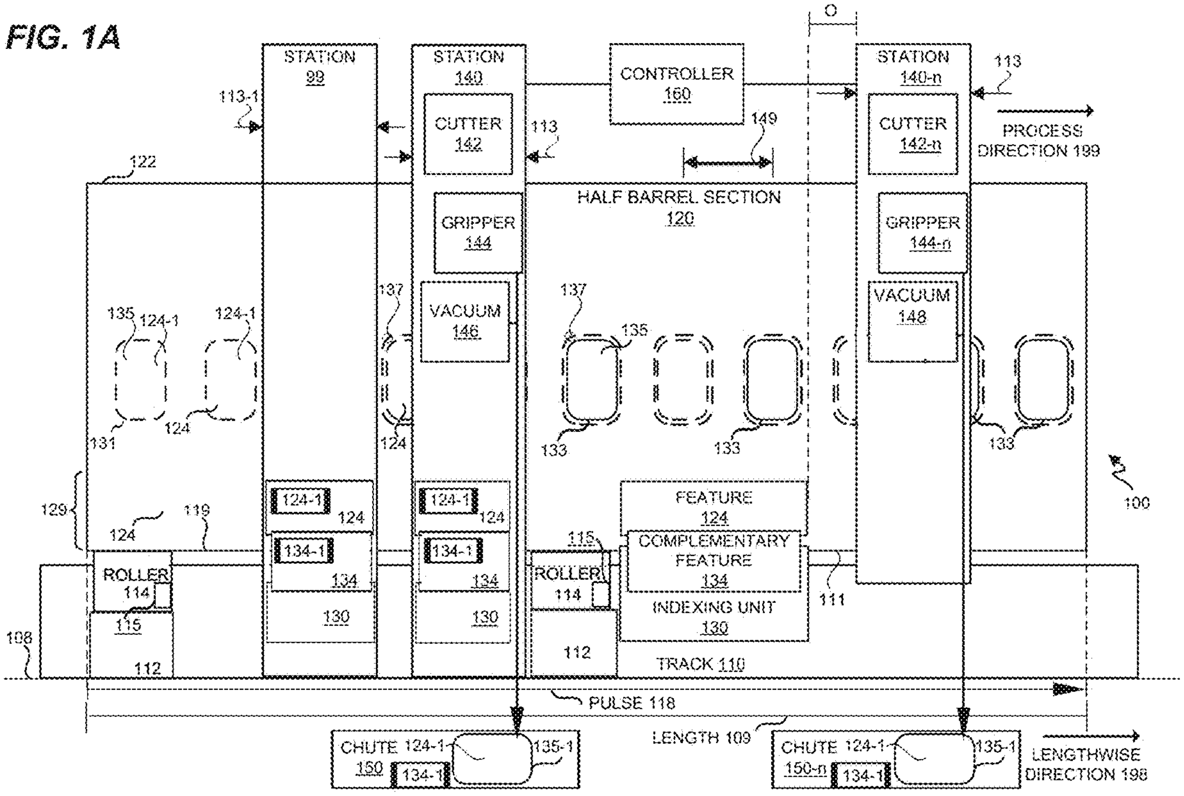
FIG. 1A-A is an illustration of a full barrel section of a fuselage of an aircraft in an illustrative embodiment.

FIG. 1A is a block diagram of an assembly line 100 in an illustrative embodiment. Assembly line 100 comprises any system, device, or component operable to pulse 118 or to iteratively micro pulse 149 a half barrel section 120 a distance less than its length 109 along a track 110 at frame pitch 147 (FIG. 1C-C) and to perform work on the half barrel section 120 while the half barrel section 120 is paused between pulses 118 or micro pulses 149. In further embodiments, assembly line 100 continuously moves the half barrel section 120 at a desired takt while work is performed upon half barrel section 120. The half barrel section 120 comprises a portion of fuselage 12 when assembled into half barrel sections 24. An embodiment has half barrel section 120 of approximately forty feet long while some other half barrel sections 24 are about twenty-five feet long. In such embodiments, the sections of fuselage may comprise any suitable arcuate portion of fuselage, such as a one-third, one-quarter, one-sixth barrel section of fuselage as desired. In some embodiments, the half barrel section 120 comprises a hardened composite part or a metal part, such as a section of the skin of an aircraft in which stringers and/or frames have been installed in order to enhance rigidity.

In this embodiment, assembly line 100 includes the track 110, which supports the half barrel section 120 as the half barrel section 120 proceeds in the process direction 199. The track 110 comprises one or more rails 111, stanchions 112 (also referred to as pogos) having rollers 114 or grooves, other elements that facilitate motion (e.g., rolling or sliding) of the half barrel section 120 along the track 110 while also enforcing a desired position and/or orientation upon the half barrel section 120. In further embodiments, the track 110 includes a chain drive, motorized cart, or other powered system that is capable of moving the half barrel section 120 in the process direction 199.

Assembly line 100 further comprises indexing units 130. In this embodiment, each indexing unit 130 is designed to physically couple with a feature 124 in a surface of the half barrel section 120. In further embodiments, coupling comprises aligning the indexing unit with a feature 124 at the half barrel section 120. In further embodiments, the feature 124 comprises a Radio Frequency Identifier (RFID) chip at the half barrel section 120, and coupling comprises reading the RFID chip associated with the half barrel section 120. In one embodiment, the indexing unit 130 indexes to a section of window manufacturing excess prior to the cutter cutting the material. In further embodiments, the indexing units 130 are dimensioned for interacting with RFID chips associated with the half barrel section 120, such as on a half barrel section 120 that proceeds along a process direction 199 during assembly. In further embodiments, it is also possible to index and/or align trim tooling to installed window or door surrounds (e.g., surrounds 397 of FIG. 3). The surrounds can also be used as trimming templates.

The features 124 are placed at known locations along the half barrel section 120, and in one embodiment each of the features 124 is separated by the same distance along the half barrel section 120, although in further embodiments the features 124 are separated by varying distances that are predefined. In further embodiments, the features 124 are disposed in a manufacturing excess of the half barrel section 120, which is trimmed away prior to the half barrel section 120 being attached to additional components and entering service (i.e., trimmed away with the excess when no longer needed for manufacturing indexing). In such embodiments, a station is indexed to an indexing feature in a section of window manufacturing excess prior to the section of window manufacturing excess being trimmed off. In such an embodiment, the features 124 (i.e., indexing features) are disposed on a manufacturing excess selected from the group consisting of: a window manufacturing excess and a lower edge manufacturing excess of a fuselage.

In still further embodiments, indexing units do not physically couple with the half barrel section 120, because they include components (e.g., lasers, acoustic sensors, cameras, rollers, etc.) that precisely detect a position of the half barrel section 120. That is, the half barrel section 120 is scanned/characterized as needed for the stations which are working on the half barrel section 120 during the current pulse without performing any physical coupling as the half barrel section 120 proceeds in the process direction 199 during assembly. In one embodiment, information provided via indexing (e.g., a shape or identifier associated with an indexing feature) indicates that a station shall stand down or remain idle for a period of time, instead of operating upon the half barrel section 120.

Assembly line 100 further comprises indexing units 130. Each indexing unit 130 is designed to physically couple with a feature 124, such as a machined feature such as a hole or slot and/or an added feature such as a pin in the half barrel section 120. The features 124 are placed at locations along the half barrel section 120. In one embodiment, each of the features 124 is separated by a distance such as micro pulse 149 or a fraction or multiple thereof along the half barrel section 120. In an embodiment, each of the features 124 is separated by the different distances along the half barrel section 120. In another embodiment, each of the features 124 are not linearly aligned in lengthwise direction 198 along the half barrel section 120. In further embodiments, the features 124 are disposed in a manufacturing excess 129, 135 (i.e. section of material) of the half barrel section 120, which is trimmed away prior to the half barrel section 120 entering service.

In further embodiments, tracking with RFID is used for indexing. The RFID tag 124-1 is associated with and located in the manufacturing excess 129, 135 as part of a feature 124. The RFID scanner 134-1 is part of complementary feature 134. The RFID tag 124-1 is mounted singularly or along with other feature 124 in locations optimal to conveying indexing information to a cutting station, referred to specifically herein as a window manufacturing excess trim out station 140, 140-*n*. The RFID scanner 134-1 is mounted singularly or along with other complementary features 134 in locations optimal for communicating with feature 124 including RFID tag 124-1 to conveying indexing information to window manufacturing excess trim out station 140, 140-*n*. The indexing conveys information to window manufacturing excess trim out station 140, 140-*n* about half barrel section 120 within the purview 113 of window manufacturing excess trim out station 140, 140-*n*. In such an embodiment, the RFID tags 124-1 themselves are used as the features 124, and are serially located, (e.g., linearly aligned or non-linearly aligned) upon the manufacturing excess 129, 135 of the half barrel section 120. The indexing feature 124 including RFID tags 124-1 align with the complementary features 134 located relative to window manufacturing excess trim out station 140, 140-*n* and work station 99. The indexing feature 124 including RFID tags 124-1 communicate specifics of desired 3D characterization, representation and/or orientation of IML 128 and OML 122 (FIG. 1) for the half barrel section 120 via indexing unit 130 to controller 160. The operations of the track 110, window manufacturing excess trim out station 140, 140-*n*, work station 99 and/or other components are managed by controller 160. In some embodiments, these features 124, including RFID tags 124-1, also include instructions for work to be performed by the window manufacturing excess trim out station 140, 140-*n* and work station 99. For example, in an embodiment where window manufacturing excess trim out station 140, 140-*n* and/or work station 99 perform work on different purviews of a half barrel section 120 at the same time. An embodiment has an upper half barrel section followed by a lower half barrel section progressing serially down assembly line 100. Another embodiment has the half barrel section 120 one model followed the half barrel section 120 of a different model. The indexing feature 124 on each half barrel section 120 communicates to the window manufacturing excess trim out station 140, 140-*n* and/or work station 99 what, if any, work needs to be completed on the particular section within purview 113, 113-1 as it pauses between micro pulses 149 or during micro pulses 149 through window manufacturing excess trim out station 140, 140-*n* and/or work station 99. The indexing feature 124 also communicates the OML 122 and IML 128 information during indexing.

In one embodiment, controller 160 determines a progress of the half barrel section 120 along the track 110 based on indexing, input from a technician, or artificial intelligence in accordance with an automated process such as input from a camera or physical sensor, such as a linear or rotary actuator. Work is performed on half barrel section 120 purview 113, 113-1 in window manufacturing excess trim out station 140, 140-*n* and/or work station 99, respectively, based upon index information conveyed to window manufacturing excess trim out station 140, 140-*n* and/or work station 99. Then controller 160 instructs the window manufacturing excess trim out station 140, 140-*n* and/or work station 99. Work station 99 is an installation station such as installation, or door surround installation or frame 146 installation. Window surround 137 installation, door surround installation or frame 146 installation stiffen up the half barrel section 120 prior removing manufacturing excess 135. The controller 160 uses this input to manage the operations on the half barrel section 120 within purview 113, 113-1 in window manufacturing excess trim out station 140, 140-*n* and/or work station 99 in accordance with instructions stored in a Numerical Control (NC) program. Controller 160 may be implemented, for example, as custom circuitry, as a hardware processor executing programmed instructions, or some combination thereof.

In this embodiment, each of the indexing units 130 includes a complementary feature 134 for insertion into, grasping, or otherwise fitting with a feature 124. Complementary feature 134 for insertion into, grasping, or otherwise fitting with a feature 124 provides a hard stop at the end of a micro pulse 149. Indexing units 130 are placed at locations relative to the window manufacturing excess trim out station 140, 140-*n* and/or work stations 99 and track 110. Indexing units 130 are fixed relative to window manufacturing excess trim out station 140, 140-*n* and/or work station 99 for embodiment hard stops at the ends of micro pulse 149. Indexing units 130 are not fixed relative to window manufacturing excess trim out station 140, 140-*n* and/or work station 99 for indexing during micro pulse 149 or continuous assembly. An embodiment has half barrel section 120 micro pulse 149 a distance at least equal to the shortest distance between features 124 and indexed to the indexing units 130, and worked upon by the window manufacturing excess trim out station 140, 140-*n*. That is, the half barrel section 120 is indexed as part of a micro pulse 149, pulse 118 or continuous system. Whenever the features 124 in the half barrel section 120 and the complementary features 134 in the indexing units 130 are mated, the location of the half barrel section 120 is indexed to a known location and the 3D characterization, representation and/or orientation of the half barrel section 120 relative to the track 110, the indexing units 130, and the window manufacturing excess trim out station 140, 140-*n* and/or work station 99 is known. Specifically, an embodiment has each indexing unit 130 disposed at a known offset (O) (e.g., along three axes) from the window manufacturing excess trim out station 140, 140-*n* and/or work station 99, meaning that the act of indexing a half barrel section 120 to the indexing units 130 causes the position of the half barrel section 120 OML 122 and/or IML 128 relative to the window manufacturing excess trim out station 140, 140-*n* to be known. This embodiment is illustrated with indexing unit 130 offset O from window manufacturing excess trim out station 140-*n*. Another embodiment has each indexing unit 130 disposed without offset (O) from the window manufacturing excess trim out station 140 and/or work station 99. This embodiment is illustrated with indexing unit 130 at window manufacturing excess trim out station 140 and/or work station 99. With or without the offset relative to window manufacturing excess trim out station 140, 140-*n* and/or work station 99, indexing a half barrel section 120 to the indexing units 130 causes the 3D characterization, representation and/or orientation of the half barrel section 120, relative to the position of the half barrel section 120 OML 122 and/or IML 128, the window manufacturing excess trim out station 140, 140-*n*, and/or work station 99, to be known.

In one embodiment, indexing is performed at least according to the following description. A structure in the form of a half barrel section 120 is carried upon a track 110 comprising a rail 111 embedded within or attached to the floor 108. The rails 111 are positioned in locations relative to the indexing unit 130 and window manufacturing excess trim out station 140, 140-*n* and/or work station 99. The half barrel section 120 has been fabricated on a layup mandrel according to precise dimensions, and this precise layup enables features 124 to be precisely located in a manufacturing excess 129 of the half barrel section 120. Rough trimming of the half barrel section 120 occurs upon the layup mandrel. The manufacturing excess 129 is partially trimmed off to establish a bearing edge 119. Thus, once the bearing edge 119 of the half barrel section 120 is located on the precisely located rails 111, the half barrel section micro pulses through window manufacturing excess trim out station 140, 140-*n* and/or work station 99. The 3D characterization, representation and/or orientation of the half barrel section 120 is precisely known when the indexing feature 124 is engaged, without the need for a full scan via probes or optical technology at each micro pulse 149 through window manufacturing excess trim out station 140, 140-*n* and/or work station 99. In further embodiments, Non-Destructive Inspection (NDI) is utilized as an initial station during the processing of the half barrel section 120 in order to perform an initial baseline scan during micro-pulsing or during pauses between micro pulses 149 or both, or during continuous motion. This baseline scan is used during later processing of the half barrel section and is conveyed during subsequent indexing to work stations 99.

The relative stiffness of the de-molded or otherwise formed half barrel section 120 is relied upon to help the half barrel section 120 maintain a desired IML 128 and/or OML 122 along with the precisely located rails 111 and precisely located bearing edge 119 to micro pulse 149 the half barrel section 120 without the need for any substantial shape defining tooling during micro pulsed assembly. In this arrangement, the features 124 are located precisely into the half barrel section 120 relative to the IML 128 and/or OML 122 and the precisely located rails 111 help convey the half barrel section 120 beyond window manufacturing excess trim out station 140, 140-*n* in process direction 199 through work station 99 without distortion. Therefore, a 3D characterization, representation and/or orientation and orientation of the half barrel section 120 within purview 113, 113-1 including OML 122 and/or IML 128 is known by window manufacturing excess trim out station 140, 140-*n* and/or work station 99 quickly and precisely. This information is conveyed via indexing through controller 160 after each micro pulse 149 without the need to re-scan the purview 113, 113-1 of half barrel section 120 each time. In this manner, the 3D characterization, representation and/or orientation of the half barrel section 120 OML 122 and/or IML 128 of at a specific portion within the purview 113, 113-1 of a window manufacturing excess trim out station 140, 140-*n* and/or work station 99 is quickly conveyed to that particular station.

Because of the precise indexing performed, the tools at window manufacturing excess trim out station 140, 140-*n* and each work station 99 can be located relative to the OML 122 and/or IML 128 of the half barrel section 120 as desired when the half barrel section 120 is micro pulsed into place. Quick positioning the tools and technicians within the window manufacturing excess trim out station 140, 140-*n* and work station 99 relative to the OML 122 and/or IML 128 during the pause between micro pulses 149 increases the throughput and efficiency. The 3D characterization, representation and/or orientation of the half barrel section 120 OML 122 and/or IML 128 of the half barrel section 120 within purview 113, 113-1 is then established or indexed into any Numerical Control (NC) programming or automated system in use at the window manufacturing excess trim out station 140, 140-*n* and/or work station 99. Therefore, no setup time in the form of scanning is needed after each micro pulse 149 that exposes a purview 113, 113-1 of the half barrel section 120 within the window manufacturing excess trim out station 140, 140-*n* or work station 99. Similarly, no setup time is needed to bring tooling and technicians to the purview 113, 113-1 of the half barrel section 120 within the window manufacturing excess trim out station 140, 140-*n* or work station 99 during the micro pulse 149 or the pause between micro pulses 149 or both. In some embodiments, multiple serially arranged NDI stations and/or work stations 99 perform work upon the half barrel section 120 during the same pause between micro pulses 149. Furthermore, structure added to or removed from the half barrel section 120 in the prior work station 99 may be added or augmented to the half barrel section 120 electronic model or representation within the system and conveyed via indexing, without the need to scan the half barrel section 120 for the changes after and/or during micro pulse 149. These augmentations can be done automatically, wherein typical characteristics/structures are added virtually to the scanned model.

That is, the indexing of a half barrel section 120 may be performed by aligning the indexing feature 124 to the indexing unit 130. The window manufacturing excess trim out station 140, 140-*n* has a known positional relationship with the indexing unit 130. Indexing a half barrel section 120 includes mating a feature 124 at the half barrel section 120 with a complementary feature 134 at an indexing unit 130 having a known physical offset from the window manufacturing excess trim out station 140, 140-*n*, such that the mating instantly results in the half barrel section 120 OML 122 and IML 128 having a known location relative to the window manufacturing excess trim out station 140, 140-*n*. This is because the complementary features 134 at the indexing unit 130 are pre-located and sized to fit while the half barrel section 120 is at a specific and precisely determined location. In further embodiments, the indexing units 130 comprise cameras, lasers, acoustic sensors, or other components that index the half barrel section 120 without physical coupling with the indexing feature 124 of half barrel section 120.

In still further embodiments, tracking is performed by scanning the RFID tags 124-1 that are mounted upon the manufacturing excess 129, 135 of half barrel section 120 and are read as part of indexing a purview 113, 113-1 of the half barrel section 120 within the particular window manufacturing excess trim out station 140, **140-*n* and/or work station 99. The RFID tag 124-1 are features 124 and are serially located, but need not be linearly aligned upon a manufacturing excess 129 of the half barrel section 120. In one embodiment, each RFID tag 124-1 used as indexing feature 124 aligns with each of multiple serially located window manufacturing excess trim out station 140, 140-*n* and/or work station 99 and communicate specifics of the 3D characterization, representation and/or orientation of the half barrel section 120 OML 122 and/or IML 128 as well as instructions for work to be performed at the window manufacturing excess trim out station 140, 140-*n* and/or work station 99. The window manufacturing excess trim out station 140, 140-*n* and/or work station 99 work on purviews 113, 113-1 of half barrel section 120 followed by a different half barrel section followed by a different half barrel section and of the same model of aircraft or a different model of aircraft, or a different section of the same model as the first two sections, as desired. The RFID tag 124-1 explains to the station what, if any, work shall be completed on the particular section being pulsed through window manufacturing excess trim out station 140, 140-*n* and/or work station 99**.

Scanning may be performed up stream of the work station that uses scan information, and the scanning may occur once or may occur multiple times. For example, scanning may occur at an NDI station and can be augmented by additions or subtractions to the half barrel section 120 being scanned.

Returning to the embodiment of FIG. 1A, each of the indexing units 130 includes a complementary feature 134 for insertion into, grasping, or otherwise fitting/joining/coupling with a feature 124. Indexing units 130 are placed at fixed, known locations relative to window manufacturing excess trim out station 140, **140-*n* and/or work station 99 and track 110. Whenever the features 124 in the half barrel section 120 and the complementary features 134 in the indexing units 130 are mated, the location of the half barrel section 120 is indexed to a known location in a coordinate space shared by the track 110, the indexing units 130, and the window manufacturing excess trim out station 140, 140-*n* and/or work station 99. Thus, indexing provides a technique for characterizing the half barrel section 120 at each of the window manufacturing excess trim out station 140, 140-*n* and/or work station 99. When the part is indexed, the configuration and loft of the part are known at the station to within desired tolerances. In further embodiments, half barrel section 120 retains a desired IML 128 and/or OML 122 shape without the external application of force. In any case, the half barrel section 120 is in conformance with a desired IML 128 and/or OML 122 when it receives work from window manufacturing excess trim out station 140, 140-*n* and/or work station 99. Specifically, each indexing unit 130 is disposed at a known offset (O) (e.g., along three axes) from a station 140, meaning that the act of indexing the half barrel section 120 to the indexing units 130 causes the position of the half barrel section 120 relative to window manufacturing excess trim out station 140, 140-*n* and/or work station 99 to be known at window manufacturing excess trim out station 140, 140-*n* and/or work station 99. The width of the track 110 along with the shape of the half barrel section 120, and the delaying of performing window or door cut-outs until after installation of the frames 146 and window surround 137 and door surrounds, and possibly other means of maintaining the desired curvature, help to ensure that the section configuration is as desired when indexed at a particular station. Work station 99 installs the window surround 137 around manufacturing excess 135** prior to trimming it off.

The relative stiffness of the de-molded or otherwise formed half barrel section 120 is relied upon to help the half barrel section 120 maintain a desired IML 128 and OML 122 along with the precisely located rails 111 and without the need for adding any substantial shape defining tooling during pauses between pulse 118 or micro pulse 149 and/or during pulse 118 or micro pulse 149 assembly.

Because of the precise indexing performed, the tools at window manufacturing excess trim out station 140, **140-*n* and/or work station 99 are able to know exactly where they are relative to the half barrel section 120 when the half barrel section 120 is indexed with indexing unit 130. Therefore, no setup time or scanning is needed after each pulse 118 or micro pulse 149 of the half barrel section 120. Furthermore, structure added to or removed from the half barrel section 120 in the prior station may be added to a model or representation that within the system (e.g., at a controller 60), without the need to scan the half barrel section 120 for the changes after each pulse 118 or micro pulse 149**.

Window manufacturing excess trim out station 140, **140-*n* and/or work station 99 perform work on the half barrel section 120. Specifically, the window manufacturing excess trim out station 140, 140-*n* operate one or more cutters 142, 142-*n* and grippers 144, 144-*n* to perform cutting operations on the half barrel section 120 that remove manufacturing excess 135 from the half barrel section 120. The one or more cutters 142, 142-*n* use reciprocating blades, circular blades, milling or etc. The grippers 144, 144-*n* attach via vacuum coupling to manufacturing excess 135 or coupling to features 124 in a manufacturing excess 135. An embodiment has the grippers 144, 144-*n* facilitate both supporting a cutter while cutting off manufacturing excess 135, and dropping manufacturing excess 135 into chutes 150, 150-*n*. The gripper 144, 144-*n* communicates its location to the window manufacturing excess trim out station 140, 140-*n* to help it find the cutting line of the manufacturing excess 135. Another embodiment has the gripper 144, 144-*n* communicating its location relative to the window surround 137 to window manufacturing excess trim out station 140, 140-*n* helping cutter 474 follow window surround 137 like a template. Vacuums 148, 148-*n* apply suction that removes dust generated during the cutting or milling process and places into chutes 150. In one embodiment, the grippers 144, 144-*n* grip a manufacturing excess 135 of the half barrel section 120 during the cutting, and place the separated manufacturing excess 135-1 into chute 150, 150-*n* to become part of an outflow 361 of FIG. 3 at the direction of a controller 160. That is, the controller 160 coordinates control of the grippers 144, 144-*n* and cutters 142, 142-*n* such that a gripper 144, 144-*n* attaches to the manufacturing excess 135 prior to cutting, and the gripper 144, 144-*n* places the separated manufacturing excess 135-1 into an outflow 361 of the chute 150, 150-*n***.

Separated manufacturing excess 135-1 is removed from half barrel section 120 and dropped into chutes 150, **150-*n*, resulting in openings 133. In this embodiment, a window manufacturing excess trim out station 140 placed upstream with respect to the process direction 199 of the half barrel section 120 cuts out every other manufacturing excess, resulting in openings 133 and leaving the remaining manufacturing excess 135 to the window manufacturing excess trim out station 140-*n* that is disposed downstream. While two window manufacturing excess trim out stations 140, 140**-*n* are shown, depending upon desired takt, more or less stations could be employed in assembly line 100. Window manufacturing excess trim out station 140, 140-*n* are disposed along the track 110 and are separated by less than the length of the half barrel section 120. For example, stations 140 may be spaced apart by a frame pitch 147 or a fraction or multiple thereof.

The operations of the window manufacturing excess trim out station are managed by controller 160. In one embodiment, controller 160 determines a progress of the half barrel section 120 along the track 110 based on input from indexing, a technician, or a Numerical Control (NC) program. For example, the controller 160 may alter instructions in an NC program for the window manufacturing excess trim out station 140, 140-*n* to accommodate any deviations in position of the half barrel section 120 from a nominal position and orientation. Controller 160 may be implemented, for example, as custom circuitry, as a hardware processor executing programmed instructions, or some combination thereof.

Illustrative details of the operation of assembly line 100 will be discussed with regard to FIG. 2. Assume, for this embodiment, that a half barrel section 120 has been pulsed down track 110 within range of an indexing unit 130.

Figure 2:
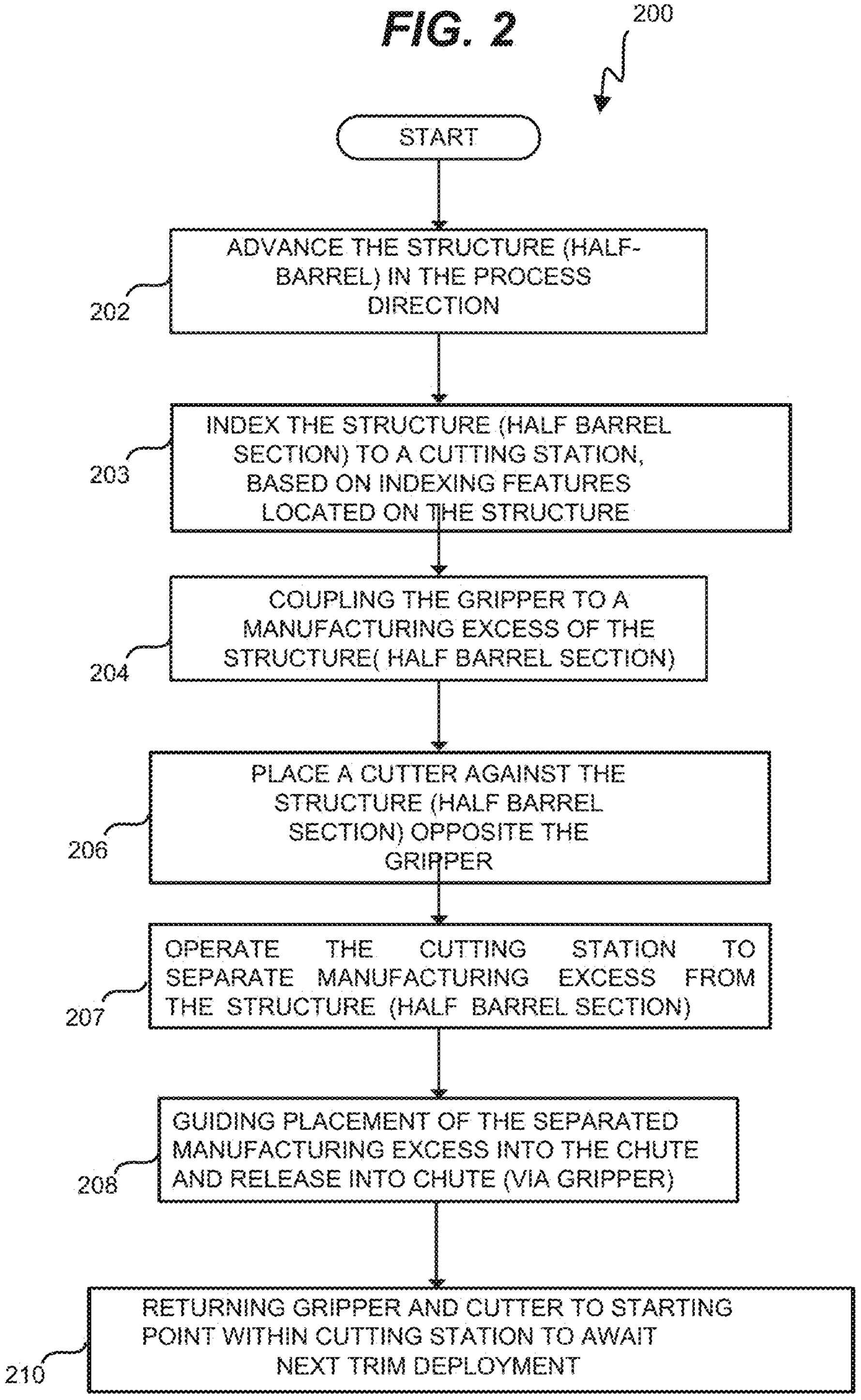
FIG. 2 is a flowchart illustrating a method for cutting out sections of material from a structure in an illustrative embodiment.

FIG. 2 is a flowchart illustrating a method 200 for cutting out sections of material from a structure in an illustrative embodiment. The steps of method 200 are described with reference to assembly line 100 of FIG. 1A, but those skilled in the art will appreciate that method 200 may be performed in other systems. The steps of the flowcharts described herein are not all inclusive and may include other steps not shown. The steps described herein may also be performed in an alternative order.

In step 202, the structure (half barrel section 120) advances in the process direction 199. For example, the half barrel section 120 is advanced by micro pulse 149 or pulse 118. The pulse 118 is at least equal to length 109. The micro pulse 149 is equal to frame pitch 147 or a fraction or multiple thereof. In further embodiments, micro pulse 149 facilitates greater work density by permitting work stations 99 or window manufacturing excess trim out station 140, 140-*n* placement at frame pitch 147, thus increasing manufacturing work density. Work stations 99 or window manufacturing excess trim out station 140, 140-*n* may operate together after each pulse 118 or micro pulse 149 resulting in an increase in manufacturing work density and reduce floor space requirements, particularly over prior systems.

In step 203, the half barrel section 120 is indexed to window manufacturing excess trim out station 140, 140-*n*, based on features 124, RFID tags 124-1 located on the half barrel section 120. This may comprise coupling the complementary features 134 of an indexing unit 130 to the features 124, RFID tags 124-1, respectively. Upon indexing, a position of the window manufacturing excess trim out station 140, 140-*n* and/or work station 99 to the half barrel section 120 becomes precisely known. Controller 160 commands window manufacturing excess trim out station 140, 140-*n* according to the conveyed indexing. Controller 160 may then alter instructions in an NC program for the window manufacturing excess trim out station 140, 140-*n* to accommodate any deviations in position of the half barrel section 120 from the expected indexed position.

In step 204, the gripper 144, 144-*n* couples to manufacturing excess 135 of half barrel section 120. The gripper 144, 144-*n* couples to feature 124 or features 124. The grippers 144, 144-*n* attach via vacuum coupling to manufacturing excess 135 or coupling to features 124 in a manufacturing excess 135. The grippers 144, 144-*n* couple to the IML 128 or the half barrel section and in particular to the manufacturing excess 135.

Step 206 comprises placing a cutter 142, 142-*n* against the half barrel section 120 opposite the grippers 144, 144-*n*. This may comprise placing the cutter 142, 142-*n* into contact with the OML 122 of the half barrel section 120. The grippers 144, 144-*n* couple to the IML 128 or the half barrel section 120 and in particular to the manufacturing excess 135. The combination of the grippers 144, 144-*n* on the IML 128 and the cutter 142, 142-*n* on the OML 122 sandwich the half barrel section 120 there between. The cutter 142, 142-*n* and grippers 144, 144-*n* clamp the half barrel section 120 to form a clamp-up. In this manner, a gripper 144, 144-*n* supports a cutter 142, 142-*n* at the window manufacturing excess trim out station 140, 140-*n* or vice versa while the cutter 142, 142-*n* cuts out a manufacturing excess 135 with the cutter 142, 142-*n*. The gripper 144, 144-*n* communicates its location to the window manufacturing excess trim out station 140, 140-*n* to help it find the cutting line of the manufacturing excess 135. Another embodiment has the gripper 144, 144-*n* communicating its location relative to the window surround 137 to window manufacturing excess trim out station 140, 140-*n* helping cutter 142, 142-*n* follow window surround 137 like a template.

In step 207, cutting out the separated manufacturing excess 135-1 using the cutter 142, 142-*n* from the half barrel section 120, resulting in an opening 133 at the half barrel section 120. This may comprise following a predefined contour, index conveyed instructions or instruction in an NC program or some combination to separate the manufacturing excess from the half barrel section 120 in a desired manner. During this process, gripper 144, 144-*n* and cutter 142, 142-*n* may operate in tandem to clamp-up the half barrel section 120 and hold the manufacturing excess 135 within the claim-up. In one embodiment, operating the window manufacturing excess trim out station 140, 140-*n* to cut out the separated manufacturing excess 135-1 from the half barrel section 120. An embodiment includes a two stage trimming process comprising performing a first cut at a first tolerance resulting in a separated manufacturing excess 135-1. Then the method further comprises operating the window manufacturing excess trim out station 140 to cut out additional material from the half barrel section 120 during a second cut at a second tolerance. The first tolerance is at a less precise tolerance than the second tolerance. In one embodiment, this step involves operating multiple window manufacturing excess trim out stations 140, 140-*n* that perform work on the half barrel section 120 during a pause between pulses 118 or the pause between micro pulses 149 that advance the half barrel section 120 in the process direction 199. These window manufacturing excess trim out stations 140, 140-*n* may comprise multiple cutters 142, 142-*n* that operate on the same manufacturing excess 135 or different manufacturing excess 135. Other stations in the assembly line 100 comprise NDI stations, painting stations, sealing stations, window surround install stations, door surround install stations, and/or cleaning stations, all of which are not shown, that operate on the same or different half barrel section, often at the same time. In an embodiment, the grippers 144, 144-*n* and cutters 142, 142-*n* accommodate lateral motion of the half barrel section 120 during micro pulse 149 or continuous motion relative to the window manufacturing excess trim out stations 140, 140-*n*.

In step 208, the separated manufacturing excess 135-1 is disposed, by dropping separated manufacturing excess 135-1 down a chute 150, 150-*n*. The gripper 144 removes the separated manufacturing excess 135-1 that was cut off the half barrel section 120, guiding it prior to dropping the material down the chute 150, 150-*n*. The chute 150, 150-*n* employs gravity or some other means of removal device down the chute 150, 150-*n*. In embodiments where the half barrel section 120 is continuously driven, the gripper 144, 144-*n* and cutter 142, 142-*n* may proceed, at least partially, in the process direction 199 along with the half barrel section 120 as fabrication continues. The separated manufacturing excess 135-1 exiting the window manufacturing excess trim out station 140, 140-*n* may also be tracked by RFID tag 124-1 upon separated manufacturing excess 135-1 by RFID scanner 134-1. These RFID tags provide unique identifiers, and the material may exit the station through and under the floor 108 and/or under the track 110 between stanchions 112. In one embodiment, the gripper 144, 144-*n* disposing the separated manufacturing excess 135-1 comprises placing the separated manufacturing excess 135-1 into the chute 150, 150-*n* and releasing it into chute 150, 150-*n*. The separated manufacturing excess 135-1 becomes part of an outflow 361 that removes the separated manufacturing excess 135-1 from the window manufacturing excess trim out station 140, 140-*n*.

In step 210, separating the cutter 142, 142-*n* from half barrel section 120 and returning it and gripper 144, 144-*n* to a starting point within the window manufacturing excess trim out station 140, 140-*n* to await the next trim deployment Method 200 facilitates separating manufacturing excess 135 as part of a window manufacturing excess trim out station 140, 140-*n* through which a half barrel section 120 pulses 118, micro pulses 149 or continuously progresses through while moving in process direction 199. The window manufacturing excess trim out station 140, 140-*n* is serially arranged in an assembly line 100 with other work stations 99 covering NDI stations, rework station, frame installation station, window surround installation station, door surround installation station upstream and edge trim out station, painting station, sealing station, and/or cleaning station located downstream. Many of these stations, not shown, are working upon half barrel section 120 at the same time at a common takt time as window manufacturing excess trim out station 140, 140-*n*. The serial arrangement of window manufacturing excess trim out station 140, 140-*n* and work stations 99 greatly increases work density upon half barrel section 120.

Figure 3:
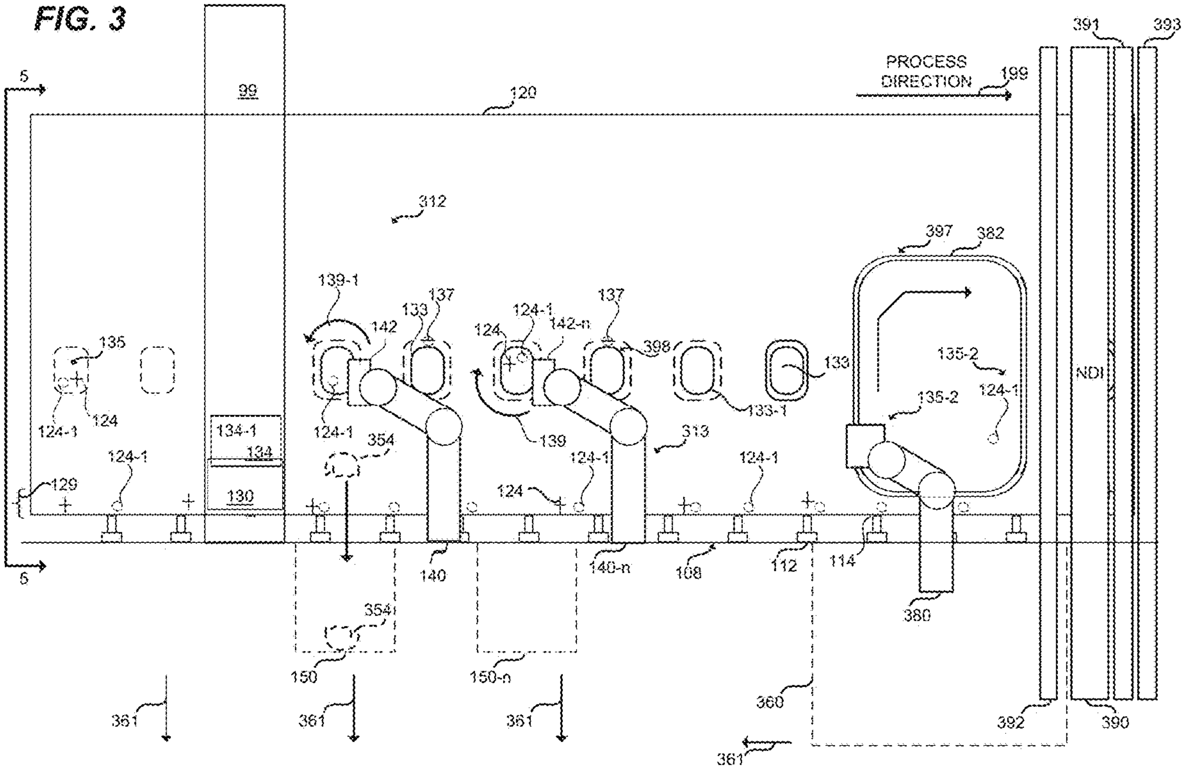
FIG. 3 illustrates a series of cutting stations in a fabrication environment in an illustrative embodiment.

FIG. 3 is an illustration of a series of cutting stations in a fabrication environment in an illustrative embodiment. FIG. 3 illustrates a series of window manufacturing excess trim out station 140, 140-*n* (e.g., end effectors 313, manual tools (not shown), etc.) in a fabrication environment. According to FIG. 3, the window manufacturing excess trim out station 140, 140-*n* perform cutting operations at a surface 312 of a half barrel section 120. The half barrel section 120 also includes features 124 and RFID tag 124-1 located in a manufacturing excess 129, 135. Features 124 and RFID tag 124-1 are utilized by indexing units 130 and/or window manufacturing excess trim out station 140, 140-*n* to facilitate alignment before work is performed. In this embodiment, window manufacturing excess trim out station 140, 140-*n* are depicted as robot arms, although in further embodiments the cutting stations may comprise robots mounted to fixed tracks (not shown) that are placed proximate to the half barrel section 120 and follow an IML 128. In a further embodiment, each window manufacturing excess trim out station 140, 140-*n* includes or is accompanied by an NDI station 390 that inspects an edge 133-1 of opening 133 made at the window manufacturing excess trim out station 140, 140-*n*.

The half barrel section 120 is transported along stanchions 112, which are secured to floor 108, and include rollers 114 and/or grooves (not shown) that enforce a desire alignment with the half barrel section 120. The half barrel section 120 includes window surrounds 137, which manufacturing excess 135 where window cut-outs will be placed. The window surrounds 137 therefore are located just beyond boundaries of the manufacturing excess 135. In one embodiment, the window manufacturing excess trim out station 140, 140-*n* uses the window surround 137 as a guide to control the position of a cutter 142, 142-*n* during separation of manufacturing excess 135. In other words, the window surround 137 is utilized to steer the cutter 142 during a first cut at a first tolerance resulting in separated manufacturing excess 135-1. In this embodiment, cutter 142-*n* of window manufacturing excess trim out station 140-*n*, disposed furthest upstream, cuts out a portion to perform a fine "clean up" trim to finish opening 133 leaving a desired final trim edge 398 at a second tolerance. Second tolerance being tighter than first tolerance. In one embodiment, the final trim edge 398 is achieved via a cutter or machining process such as using a router or a mill.

Iteratively cutting out portions 354 of manufacturing excess 135 from the half barrel section 120 reduces the bulk of individual pieces dropped into the chutes 150, and removed via outflows 361, which may be implemented as conveyors, tracks, vacuum systems, containers, etc. Dropping the individual portions into the chutes 150, 150-*n* ensures easier more efficient handling of the separated portions 354. Furthermore, this arrangement enables routing of separated manufacturing excess 135-1 away from window manufacturing excess trim out station 140, 140-*n* via an outflow 361.

Furthermore, by iteratively operating the window manufacturing excess trim out station 140, 140-*n* to cut out a manufacturing excess 135 from the half barrel section 120 and advancing the half barrel section 120 in the process direction 199, cut-outs for windows or other repeating openings may be rapidly installed. While iterative trimming may reduce blade wear and/or blade deflection using window manufacturing excess trim out station 140, 140-*n*, one pass cutting is also envisioned, wherein cutting to final trim edge 398 is performed in one pass and one or more window manufacturing excess trim out stations 140, 140-*n* are disposed along the assembly line 100.

FIG. 3 also depicts a door manufacturing excess trim out station 380, which follows a door surround 382 to cut out a manufacturing excess 135-2 for a door. That is, the cutting station utilizes a door surround 382 or surround 397 for a window as a template for guiding cut-out operations for that door or window. In further embodiments, door manufacturing excess trim out station 380 is integrated into window manufacturing excess trim out station 140, 140-*n*, and performs work when a door location advances to the window manufacturing excess trim out station 140, 140-*n*, as the presence of manufacturing excess 135-2 for door means that no manufacturing excess 135 for window exists at this location. Furthermore, in additional implementations, window manufacturing excess trim out station 140, 140-*n* and door manufacturing excess trim out station 380 may perform each other's tasks. For example, it is possible that a leading half/side of a manufacturing excess 135-2 for door cut out is worked upon by a door manufacturing excess trim out station 380 that is upstream, while simultaneously a trailing half/side of the manufacturing excess 135-2 for door cut out is being worked upon by another door manufacturing excess trim out station 380 that is downstream. It is also possible for a leading half/side of manufacturing excess 135-2 for door cut out to be worked upon by door manufacturing excess trim out station 380 and a trailing half/side of the manufacturing excess 135-2 for door cut out to be worked by the same door manufacturing excess trim out station 380 (e.g., after or even at least partially during a pulse 118 or micro pulse 149). The same approach may be used on the manufacturing excess 135 for windows by window manufacturing excess trim out station 140, 140-*n*. That is, each manufacturing excess 135 for window is cut out over the span of two pulses or micro pulses, and similarly doors may be cut out over the span of two or more pulses 118 or micro pulses 149. Similar operations may be performed by additional window manufacturing excess trim out station 140, 140-*n* to cut out manufacturing excess 135, perform antenna cut-outs, etc. In some embodiments, an air knife 392 for sweeping debris after cutting operations for removing dust during a pulse 118 or micro pulse 149 or during continuous motion after cutting has been performed. An NDI station 390 is placed downstream of the window manufacturing excess trim out station 140, 140-*n*. In one embodiment, after sweeping debris, the debris is routed away from window manufacturing excess trim out station 140-*n* and via chute 150-*n* to outflow 361.

Cutter 142 is shown trimming in a counter clockwise direction 139-1 during trimming. Cutter 142-*n* is shown trimming in a clockwise direction 139 during trimming.

The NDI station 390 inspects final trim edges 398 at the openings 133 in order to detect out of tolerance conditions such as delaminations, voids or other conditions that necessitate analysis or re-work. The NDI station 390 may be narrowly focused on scanning the trim edges 398 and window surround 137, or may be used to broadly scan the half barrel section 120, and in particular, frame 146, window surround 137 and door surround 382 installation. FIG. 3 further depicts a scaling station 391 that seals final trim edges 398 for windows, doors, or lower half barrel edges, as well a painting station 393 that paints openings for windows, doors, or lower edges.

Figure 4A:
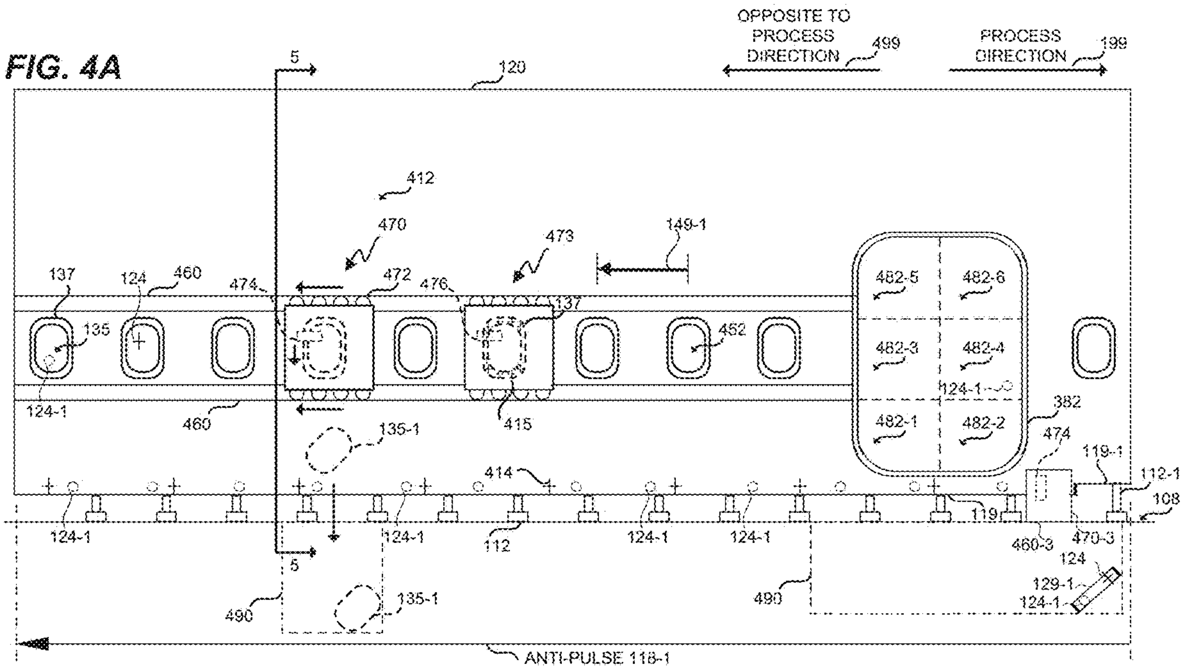
FIG. 4A illustrates a track-mounted cutting station in a fabrication environment in an illustrative embodiment.

FIG. 4A illustrates a track-mounted cutting station in a fabrication environment in an illustrative embodiment. FIG. 4A illustrates a cutting station 470 that is temporarily/removably track mounted in a fabrication environment in an illustrative embodiment. In the embodiment, cutting station 470 takes the form of a flex track type device. According to FIG. 4A, the cutting station 470 travels via wheels 472 along a track 460 that is removably mounted to half barrel section 120, and operates a cutter 474 to perform cutting operations at a surface 412 of the half barrel section 120 within a window belt. Track 460 is removably mounted to half barrel section 120 via suction cups and/or vacuum coupling. Similar to window manufacturing excess trim out station 140, 140-*n* (FIG. 3), indexing conveys cutting instructions to cutting station 470 and secondarily to cutter 474 covering in instances where a window is needed, cutting location and dimensions or where a window is not needed, to skip the location. The window surround 137 is also capable of being used as a template during the cutting in a manner similar to window manufacturing excess trim out station 140, 140-*n*. Again, similar to the method used on window manufacturing excess trim out station 140, 140-*n*, a gripper 144, 144-*n* (FIG. 1A) is coupled on the IML 128 or the manufacturing excess 135 within the window surround 137. The gripper 144, 144-*n* location relative to the window surround 137. The gripper 144, 144-*n* communicates its location to the cutting station 470 to help it find the cutting line of the manufacturing excess 135. Another embodiment has the gripper 144, 144-*n* communicating its location relative to the window surround 137 to cutting station 470 helping cutter 474 follow window surround 137 like a template. The gripper 144, 144-*n* places the separated manufacturing excess 135-1 into chute 150, 150-*n* (FIG. 1A). The gripper 144, 144-*n* is located at a fixed point on floor 108 or travels along on an interior track on wheels in a fashion similar to track 460 and wheels 472. The interior tracked system would be removably coupled to the IML 128 to facilitate a parallel working arrangement of gripper 144, 144-*n* with cutting station 470.

An embodiment has cutting station 470 trim off manufacturing excess 135 at a location relative to chute 150, 150-*n* that facilitates separated manufacturing excess 135-1 placement into chute 150, 150-*n*. One way this is accomplished is to make the separation of the manufacturing excess 135 occur at the same location relative to the floor 108 and chute 150, 150-*n*. Therefore, as half barrel section 120 pulses 118 or micro pulses 149 in process direction 199, the cutting station 470 along with gripper 144, 144-*n* remains relatively stationary relative to chute 150, 150-*n* by advancing in opposite to process direction 499 by a pulse 118 or micro pulse 149. The separated manufacturing excess 135-1 is then placed into chute 150, 150-*n*.

Another embodiment has a window surround installation station 473 traveling via wheels 472 along the track 460 and operates a fastener installer 476 to fasten window surround 137 to half barrel section 120 upstream of cutting station 470 within a window belt. Window surround installation station 478 installs fastener 415 through window surround 137 and half barrel section 120. In this embodiment, cutting station 470 works in tandem with window surround installation station 478.

The half barrel section 120 also includes features 124 and RFID tags 124-1, in particular, manufacturing excess 135 which may be utilized by indexing units and/or cutting station 470 to facilitate alignment with manufacturing excess 135 before work is performed. The cutting station 470 provides an advantage by moving in an anti-pulse 118-1 or anti-micro pulse 149-1 relative to half barrel section 120 as it pulses 118 or micro pulses 149 through work stations 99. The cutting station 470 moves within the coordinate system of the half barrel section 120, and hence does not require substantial re-indexing after initially being indexed to the half barrel section 120.

The half barrel section 120 is transported along stanchions 112, which are secured to floor 108, and include rollers 114 and/or grooves (not shown) that enforce a desired alignment onto the half barrel section 120. The half barrel section 120 includes window surrounds 137, which surround manufacturing excess 135 where window cut-outs will be placed. Cutting station 470 may direct the cutter 474 to follow the window surround 137 used as an inner or an outer boundary of a window surround 137 in order to facilitate cutting operations. Separated manufacturing excess 135-1 is then dropped into a gravity chute 490. In further embodiments, additional features at the manufacturing excess 135 and/or manufacturing excess 135-2 for door cut-out regions may be utilized as guides to facilitate the direction of movement of the cutter 474. Specifically, the features 124 and/or RFID tag 124-1 guide a location of the cutter 474 relative to a manufacturing excess 135. After cut out operations have been completed, an opening 133 for a window remains.

FIG. 4A also depicts a door surround 382, and trim regions 482-1 through 482-6 which may be cut from a manufacturing excess 135-2 inside of the door surround 382. Breaking the entire door into regions 482, regions 482-1 through 482-6, facilitates the handling of separated regions 482-1 through 482-6, in a similar manner as discussed above for separated manufacturing excess 135-1. That is, breaking/cutting into smaller sizes makes for easier disposal, and may even allow for multiple cutters to separate the manufacturing excess 135-2 for door from half barrel section 120 at the same time.

In a further embodiment, multiple cutting stations 470 travel along a track to perform iterative cutting. For example, a lead cutter may implement a rough cut, followed by one or more cutters cutting a window to a final trim edge for an opening. In further embodiments, NDI edge inspection devices, edge sealing devices, and/or painting devices follow the cutters on the track and work upon the trimmed edge.

Figure 4B:
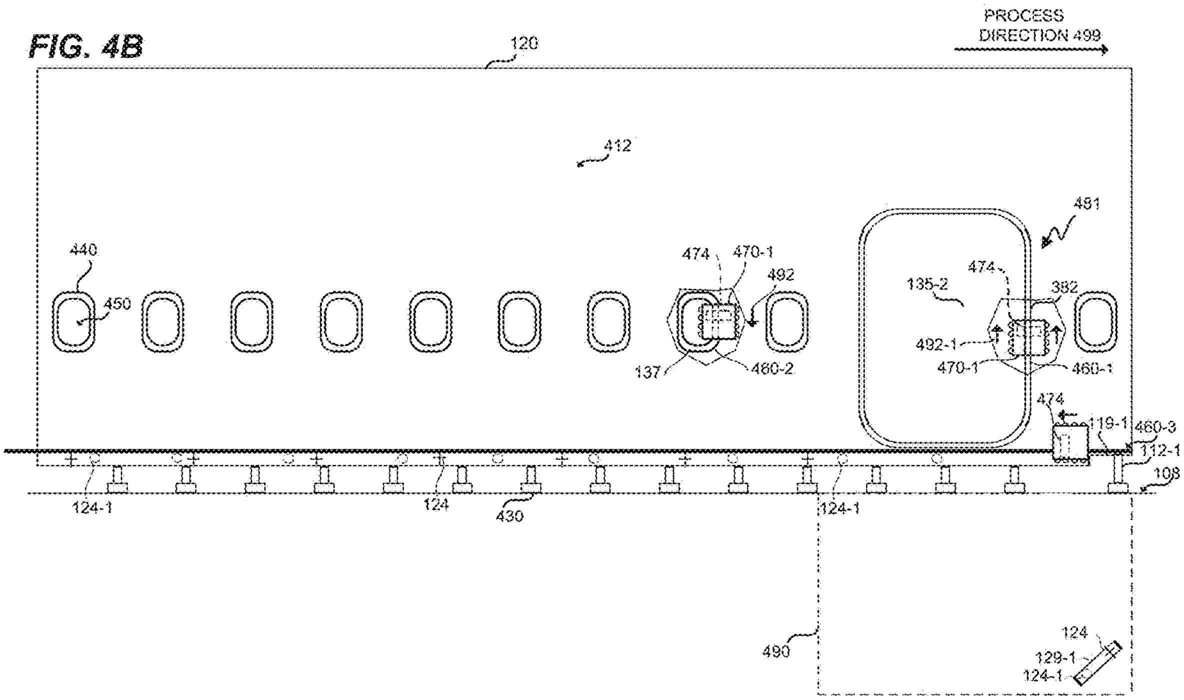
FIG. 4B illustrates a further track-mounted cutting station in a fabrication environment in an illustrative embodiment.

FIG. 4B illustrates a further track-mounted cutting station in a fabrication environment in an illustrative embodiment. In this embodiment, one or more cutting stations 470-1 are mounted to a track 460-1 removably coupled to door surround 382 and/or half barrel section 120 and proceed around the door surround 382 to cut out manufacturing excess 135-2 for door using cutters 474. The cutting station 470-1 cuts through half barrel section from IML 128 side to create separated manufacturing excess 135-2. The cutting station 470-1, shown through a cut away 481 through half barrel section 120, is shown progressing in a counter clockwise direction 492-1. One or more cutting stations 470-1 are capable of mounting upon a track 460-2 removably coupled to window surround 137 and/or half barrel section 120 and proceed around the window surround 137 to create separated manufacturing excess 135-1 for window using cutters 474. The cutting station 470-1, shown through a cut away through half barrel section 120, is shown progressing in a clockwise direction 492.

Any of the cutting stations 470 discussed with regard to FIGS. 4A-4B may be movably or fixedly mounted to the half barrel section 120 (e.g., via tracks 460, 460-1, 460-2) affixed to the half barrel section 120, or features of the half barrel section 120 itself such as door surround 382 and window surrounds 137. These cutting stations 470 may travel with the half barrel section 120 as the half barrel section 120 is advanced by pulse 118 or micro pulse 149 or moved continuously in the process direction 499. The cutting stations 470 may continue to move and/or otherwise operate regardless of whether the half barrel section 120 is paused or is moving. Furthermore, the cutting stations 470-1 may remain affixed to the half barrel section 120 for longer than work station 99 takt time if desired, and may continue to operate as the half barrel section 120 advances through multiple work stations 99.

While systems for window and door cut-outs have been illustrated above, in further embodiments any suitable cut-out operations (e.g., for cargo doors, panels, antenna cut-outs, etc.) may be performed with the systems discussed above.

Figure 5:
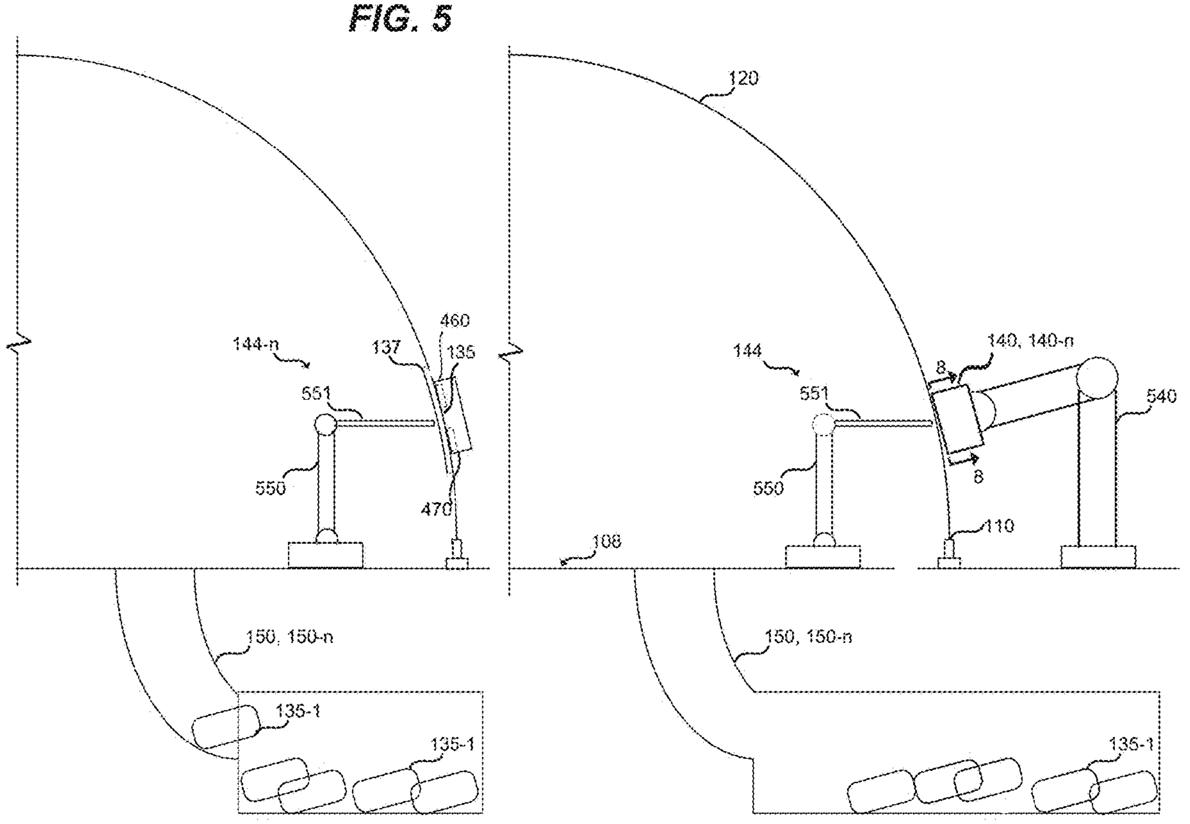
FIGS. 5-7 illustrate acquisition and removal of material cut by a cutting station in an illustrative embodiment.
Figure 6:
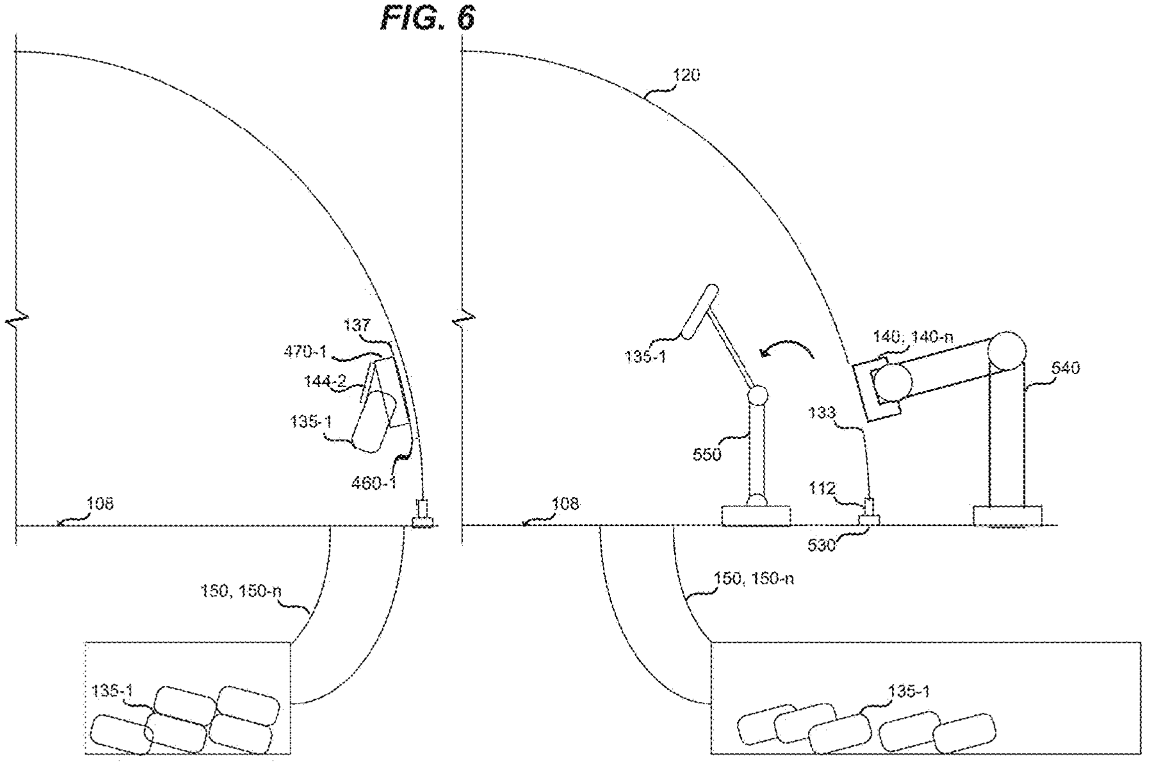
Figure 7:
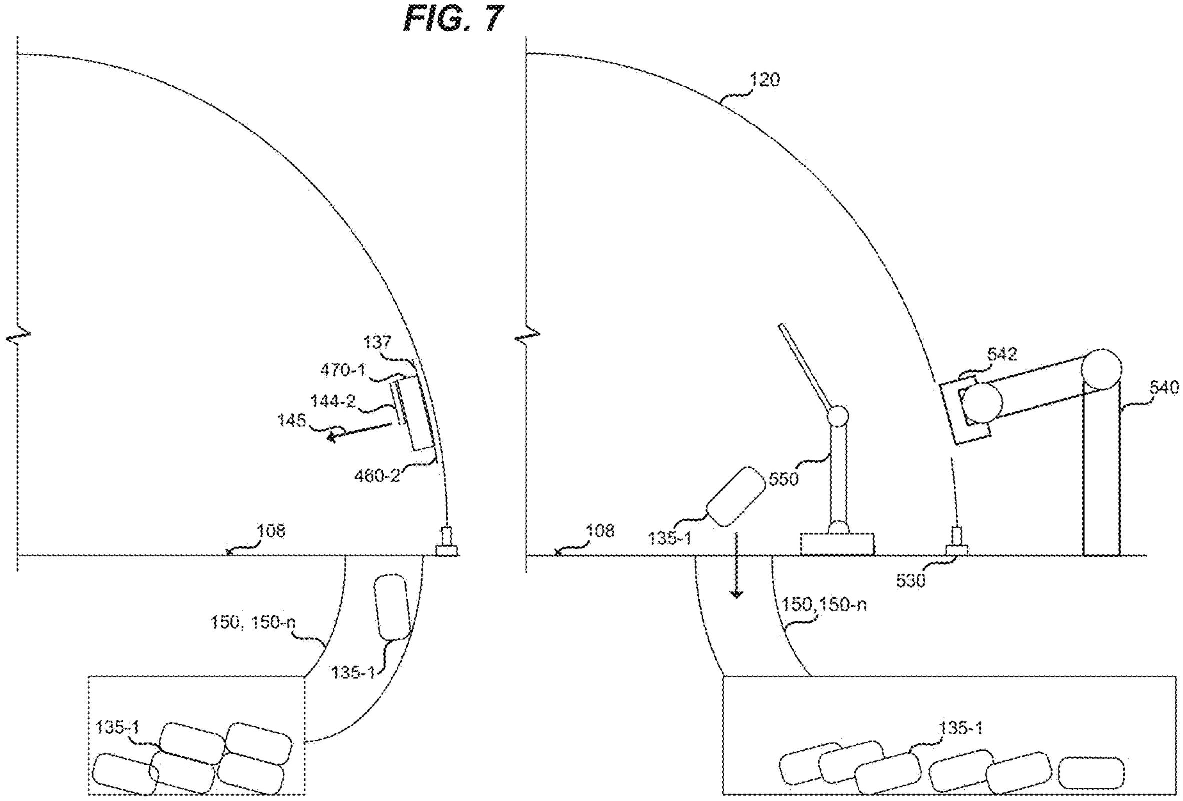

FIGS. 5-7 illustrate acquisition and removal of material cut by a cutting station in an illustrative embodiment. These FIGS. correspond with view arrows 5 of FIG. 3. In FIG. 5, a half barrel section 120, which travels along track 110, receives a removable gripping force from a gripper 144, **144-*n*, such as a robot arm 551 disposed at an IML 128 of the half barrel section 120. The removable gripping force is provided via vacuum coupling. The gripper 144, 144-*n* holds a separated manufacturing excess 135-1 that is being removed during the cutting, and disposes the separated manufacturing excess 135-1 at a chute 150, 150-*n* after operating a window manufacturing excess trim out station 140, 140-*n* or cutting station 470, 470-1, 470-2 to cut out the manufacturing excess 135, 135-1. Specifically, the gripper 144, 144-*n* applies vacuum coupling, fastens into, tacks onto, clamps onto indexing feature 124, or otherwise holds a region of the half barrel section 120 that is about to be cut via a window manufacturing excess trim out station 140, 140-*n* or cutting station 470, 470-1, 470-2 disposed at an OML 122 of the half barrel section 120. FIG. 5 further depicts a floor 108 onto which the track 110 is mounted. Chute 150, 150-*n* are located in floor 108. Window manufacturing excess trim out station 140, 140-*n* are shown on the right side of FIG. 5 working on OML 122 while cutting stations 470, 470-1 are shown on the left side at the same time. Either side are capable of being serviced by window manufacturing excess trim out station 140, 140-*n* or cutting stations 470, 470-1, 470-2. Both sides are serviced by gripper 144, 144-*n* which feeds chutes 150, 150-*n***.

The cutting station 470 travels via wheels 472 along a track 460 that is removably mounted to half barrel section 120 via suction cups and/or vacuum coupling, and operates a cutter 474 to perform cutting operations at a surface 412 of the half barrel section 120 within a window belt. Track 460 is removably mounted to half barrel section 120 via suction cups and/or vacuum coupling. Similar to window manufacturing excess trim out station 140, **140-*n*, indexing conveys cutting instructions to cutting station 470 and secondarily to cutter 474 covering in instances where a window is needed, cutting location and dimensions or where a window is not needed, to skip the location. The window surround 137 is also capable of being used as a template during the cutting in a manner similar to window manufacturing excess trim out station 140, 140-*n*. Again, similar to the method used on window manufacturing excess trim out station 140, 140-*n*, a gripper 144, 144-*n* is coupled on the IML 128 or the manufacturing excess 135 within the window surround 137. The gripper 144, 144-*n* location relative to the window surround 137. The gripper 144, 144-*n* communicates its location to the cutting station 470 to help it find the cutting line of the manufacturing excess 135. Another embodiment has the gripper 144, 144-*n* communicating its location relative to the window surround 137 to cutting station 470 helping cutter 474 follow window surround 137 like a template. The gripper 144, 144-*n* places the separated manufacturing excess 135-1 into chute 150, 150-*n*. The gripper 144, 144-*n* is located at a fixed point on floor 108 or travels along on an interior track on wheels in a fashion similar to track 460 and wheels 472. The interior tracked system would be removably coupled to the IML 128 to facilitate a parallel working arrangement of gripper 144, 144-*n* with cutting station 470**.

In FIG. 6, manufacturing excess 135 is separated, and the gripper tool 550 moves separated manufacturing excess 135-1 into position over the chute 150, **150-*n* as shown on the right side of FIG. 6. On the left side of FIG. 6, one or more cutting stations 470-1 are mounted to a track 460-1 removably coupled to window surround 137 and/or half barrel section 120, and proceed around the window surround 137 to cut out manufacturing excess 135 for door using cutters 474. Track 460-1 is removably coupled to window surround 137 either clamping and/or by vacuum coupling. The cutting station 470-1 cuts through half barrel section from IML 128 side to create separated manufacturing excess 135-1. A gripper 144-2 couples to the manufacturing excess 135 during trimming and passes the separated manufacturing excess 135-1 past cutter 474** and is dropped by gripper 144-2 into chute 150, 150-*n*. Gripper 144-2, in this embodiment, is moveably attached to cutting station 470-1. The cutting station 470-1 is capable of progressing in a clockwise direction 492 or in counter clockwise direction 492-1 relative to manufacturing excess 135. The creation of separated manufacturing excess 135-1 occurs over chute 150, 150-*n* after half barrel section 120 micro pulses 149 cutting station 470-1 over chute 150, 150-*n*. The cutting station 470-1 is then released from half barrel section 120 and cycled back to a point of origin upstream of the chute 150, 150-*n* for attachment to another portion of the half barrel section 120.

In FIG. 7, the piece of separated manufacturing excess 135-1 is dropped into the chute 150, 150-*n*, and the gripper tool 550 moves back into position to grip a new portion of the half barrel section 120. After creation of separated manufacturing excess 135-1 occurs, the cutting station 470-1 is then released from track 460-2 and cycled back to a point of origin 145 upstream of the chute 150, 150-*n* for attachment to another portion of the half barrel section 120. The track 460-2 is separated from window surround 137 and also cycled back to a point of origin 145 upstream of the chute 150, 150-*n* for attachment to another portion of the half barrel section 120.

Figure 8:
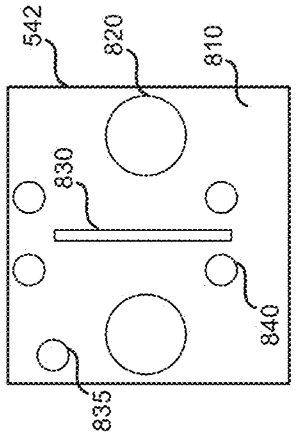
FIG. 8 illustrates a face of a cutting head in an illustrative embodiment.

FIG. 8 illustrates a face of a cutting head in an illustrative embodiment. In particular, FIG. 8 illustrates a face of a cutting head 542 of window manufacturing excess trim out station 140, 140-*n*, and corresponds with view arrows 8 of FIG. 5. In FIG. 8, a blade 830, such as a reciprocating, twisting or circular blade, a mill or other type of cutter is positioned on cutting head 542. The proximity of cutting head 542 relative to half barrel section 120 and/or manufacturing excess 135 is detected by sensors 835 to position the cutting heads 542 according to indexed conveyed information. The cutting head 542 is separated relative to the half barrel section by bumpers 820 which physically contact the half barrel section. The bumpers 820 may also serve as a vacuum coupling device using vacuum delivered to cutting head 542 through window manufacturing excess trim out station 140, 140-*n*. The bumpers 820 and the blade 830 both project out of the page beyond a body 810 of the cutting head 542 sufficiently to separate the manufacturing excess 135 from half barrel section 120. When the cutting head 542 is moved to place blade within a window surround 137, bumpers 820 contact the half barrel section 120 and the manufacturing excess 135 during cutting operations. The gripper 144, 144-*n* locates the window surround 137 and communicates it to sensor 835 and then blade 830 is guided using window surround 137 location data. The window surround 137 is installed before the window manufacturing excess trim out station 140, 140-*n*. In further embodiments, an inner or outer perimeter, or another feature of the surround acts as a guide. Suction ports 840 remove/vacuum dust/debris, Foreign Object Debris (FOD), etc. from cutting operations performed by the cutting head 542 during cutting, and the debris may be routed away from a window manufacturing excess trim out station 140, 140-*n* into chute 150, 150-*n* and beyond via outflow 361.

The half barrel section 120 pulses 118, micro pulses 149 or continuously advances into window manufacturing excess trim out station 140, 140-*n* purview 113. The half barrel section is indexed to window manufacturing excess trim out station 140, 140-*n*. The window trim out instructions are conveyed from indexing feature 124 and/or RFID tag 124-1 to window manufacturing excess trim out station 140, 140-*n*. Cutting head 542 is then located relative to manufacturing excess 135 to facilitate creating separated manufacturing excess 135-1. The cutting head 542 is then vacuum coupled to half barrel section 120 using bumpers 820 to lock it into place. The blade 830 creates separated manufacturing excess 135-1 without cutting head 542 movement relative to half barrel section 120. An embodiment has blade 830 fixed relative to the cutting head 542 with movement of the cutter relative to half barrel section 120 facilitated by cutting head 542 movement.

Figure 9:
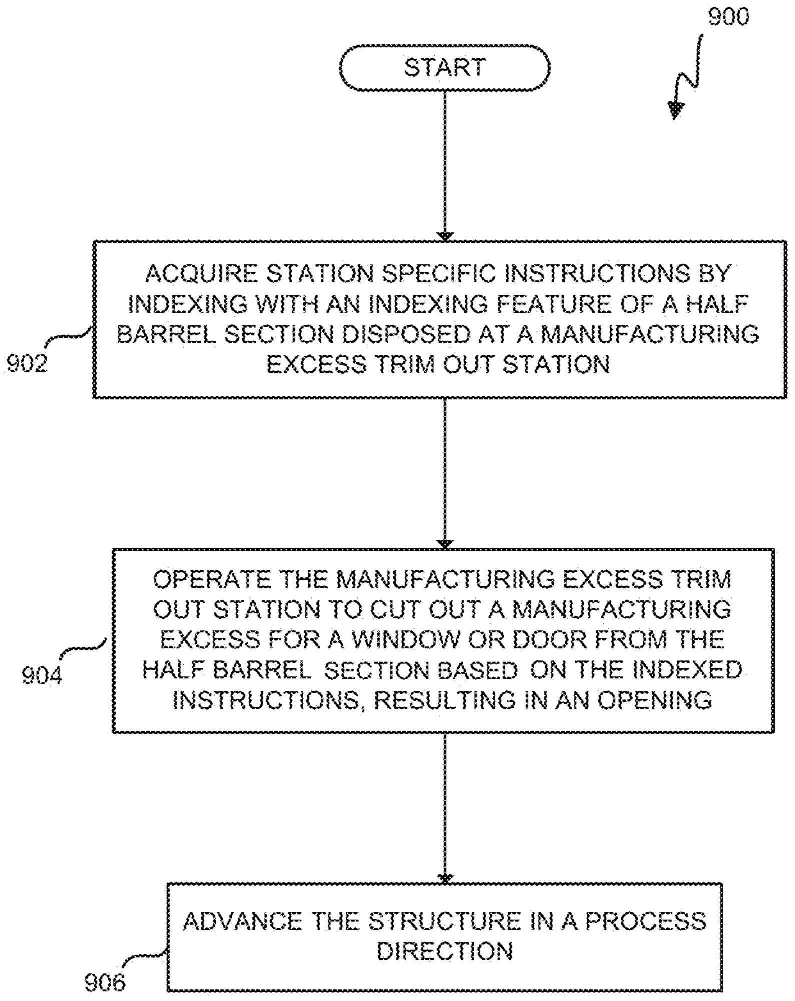
FIG. 9 is a flowchart illustrating a further method for fabricating a structure by cutting out sections from a composite part in an illustrative embodiment.

FIG. 9 is a flowchart illustrating a further method 900 for fabricating a structure by cutting out sections from a composite part in an illustrative embodiment. Step 902 includes acquiring station specific instructions by indexing with an indexing feature of a half barrel section disposed at a manufacturing excess trim out station. The station specific instructions can be indicated by one or more of a position of the feature (e.g., an indexing feature as discussed above), a spacing of the feature relative to other features, a unique identifier associated with an RFID feature comprising an RFID chip, a shape of the feature, a size of the feature, etc. For example, an indexing feature of a certain shape or size, or located at a certain position, can indicate an instruction to cut, or not cut, an opening with a specific station. The station specific instructions result in different operations at different cutting stations. That is, different stations may respond differently to the same input, for example such that upstream cutting stations omit cutting operations in response to a feature, but a downstream cutting station performs cutting operations in response to the same feature. In this manner, the feature conveys station-specific instructions, because the feature itself is interpreted to result in different actions at different cutting stations.

The instructions are acquired by an indexing unit interacting with the feature. In one embodiment, this comprises attempting to physically couple with the feature or image the feature via the indexing unit, while in another embodiment this comprises reading a feature in the form of an RFID chip (an RFID feature) embedded in the structure, via the indexing unit.

In one embodiment, acquiring station specific instructions from the feature comprises acquiring instructions that describe a portion of the structure within the purview of the station. In a further embodiment, this comprises providing station specific instructions from the feature to multiple stations regarding the portion of the structure within the purview of each station.

Step 904 includes operating the cutting station to cut out a section of material (i.e., manufacturing excess) from the structure based on the station specific instructions, resulting in an opening. In one embodiment, the instruction is interpreted as a go or no-go flag indicating whether the cutting station should operate. In a further embodiment, a shape or position or size or identifier for a feature indicates specifics of operation such as locations to be cut, cutting speed, shapes to be cut, etc.

In one embodiment, this further comprises performing operations upon the structure by multiple stations during a pause between pulses that advance the structure in the process direction. The multiple stations could comprise cutting stations, and the operations could include stand down operations for a station during which no work is performed by a station.

Step 906 includes advancing the structure in a process direction (e.g., process direction 199 of FIG. 1A). This may be performed via any of the techniques discussed above for advancing a structure (e.g., along a track).

Figure 10:
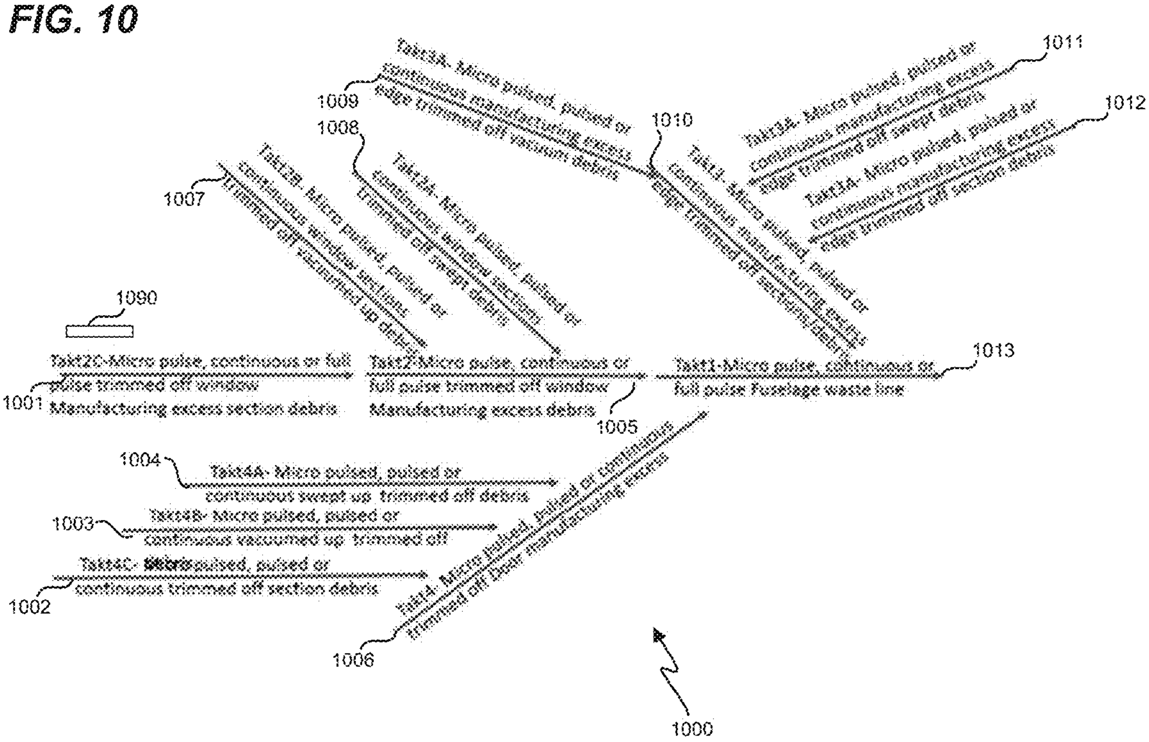
FIG. 10 depicts outflows for feeder lines in an illustrative embodiment.

FIG. 10 is an illustration of an array 1000 of feeder line outflows for in an illustrative embodiment. As used herein, an "outflow" refers to an active (e.g., motorized), vacuum propelled, pushed by airflow or passive (e.g., gravity-fed) outflow system that automatically removes debris placed in chutes 150, 150-*n* from assembly line 100. Thus, outflows 361 may comprise chutes 150, 150-*n*, tracks 110, vacuum system, Automated Guided Vehicles (AGVs), or other elements that facilitate automated removal of separated manufacturing excess 129-1, 135-1. Separated manufacturing excess 129-1 is derived from trimmed off manufacturing excess 129 from half barrel section 120.

In FIG. 10, an outflow 1001 advances debris 1090 for separated manufacturing excess 135-1. The debris 1090 advances to outflow 1005, which acquires additional debris, consisting primarily of vacuumed up debris and swept up debris from window trimming, from window trimming from outflow 1007 and outflow 1008. Outflow 1001, 1007 and 1008 are derived from the same trimming operation. Each of these outflows may receive the debris 1090 from one or more window manufacturing excess trim out station 140, 140-*n* at one or more assembly lines 100. Meanwhile, outflow 1002 provides debris 1090 from separated manufacturing excess 135-2 to outflow 1006. Outflow 1006 also includes additional debris, consisting primarily of vacuumed up debris from outflow 1003 and swept up debris from outflow 1004 is derived from trim off of manufacturing excess 135-2 from door trimming. Additionally, outflow 1012 provides debris 1090 from separated manufacturing excess 129-1 to outflow 1010. Outflow 1010 also includes additional debris, consisting primarily of vacuumed up debris from outflow 1009 and swept up debris from outflow 1011 is derived from trim off of separated manufacturing excess 129-1 from bearing edge 119 trim off.

Integrating outflow 1013 receives debris 1090 from outflow 1005, and also receives debris 1090 from outflow 1010. Outflow 1010 itself receives debris 1090 from outflow 1009, as well as outflow 1011 and outflow 1012. Thus, the outflows 1002, 1003, 1004, 1006 and outflows 1001, 1005, 1007, 1008 and outflows 1009, 1010, 1011, 1012 feed into each other until arriving at an integrating outflow 1013. That is, the integrating outflow 1013 receives debris from the multiple outflows 1001 through 1012. In this manner, as the outflows flow into each other, debris from the half barrel section 120 consisting of separated manufacturing excess 129-1, 135-1, 135-2 and associated dust from window, door and bearing edge trim off make up the debris 1090. Separated manufacturing excess 129-1, 135-1, 135-2, for the most part, still has RFID tag 124-1. An RFID scanner 134-1 could track the RFID tag 124-1 as it progresses through outflows 1001, 1002, 1003, 1004, 1005, 1006, 1007, 1008, 1009, 1010, 1011, 1012 and 1013. In one embodiment, the outflows 1001, 1002, 1003, 1004, 1005, 1006, 1007, 1008, 1009, 1010, 1011, 1012 and 1013 further comprise stations (not shown) which perform work on the debris 1090 such as sorting, breaking down, or advancing the debris 1090 along a corresponding outflow. Examples of such stations include grinders, shredders, vibrational engines, mills, stamps, sieves, baths, and other mechanical devices.

Figure 11:
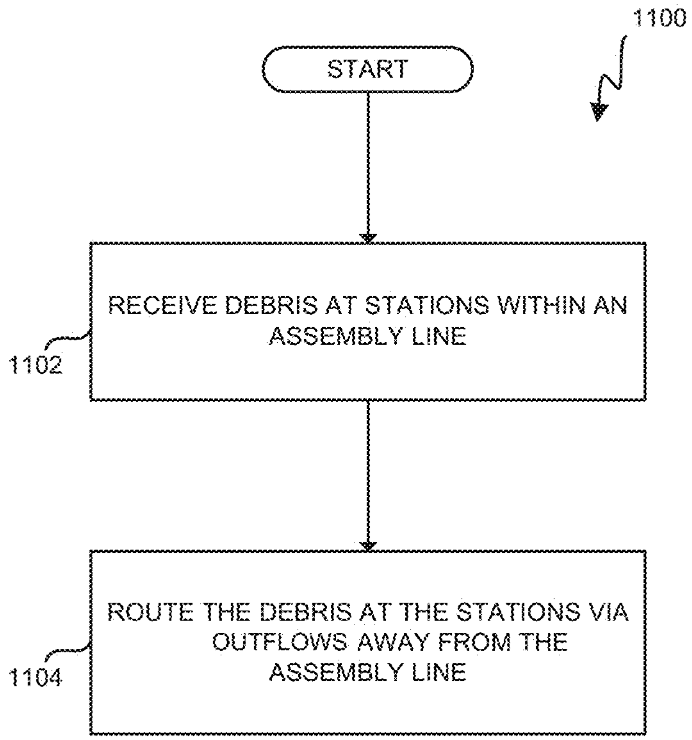
FIG. 11 depicts a method of removing debris in an illustrative embodiment.

FIG. 11 is an illustration of a method 1100 of removing debris in an illustrative embodiment. Step 1102 comprises receiving debris 1090 at stations 140, 140-*n* within an assembly line 100. The stations 140, 140-*n* generate debris 1090 at the assembly line 100. This may be accomplished as the stations 140, 140-*n* perform work such as cutting, trimming, drilling, machining, etc. at the assembly line 100. Step 1104 comprises routing the debris 1090 at the stations 140 via outflows (e.g., outflows 1001 through 1013) away from the assembly line 100. In further embodiments, the debris 1090 being removed may comprise a manufacturing excess, trim filings, dust, or other material. In a further embodiment, the debris 1090 is collected as cut-off chunks, is vacuumed as filings or chips, or is swept as filings or chips.

In further embodiments, multiple stations 140 feed trimmed off debris 1090 for windows, or trimmed off debris 1090 for doors, or trimmed off debris 1090 for a manufacturing excess disposed at an edge of a section of fuselage. In further embodiments, similar arrangements of outflows may be utilized to remove debris 1090 for a wing, such as excess trim and/or access hole material, or to remove any kind of debris 1090 for a fuselage.

EXAMPLES

Figure 12:
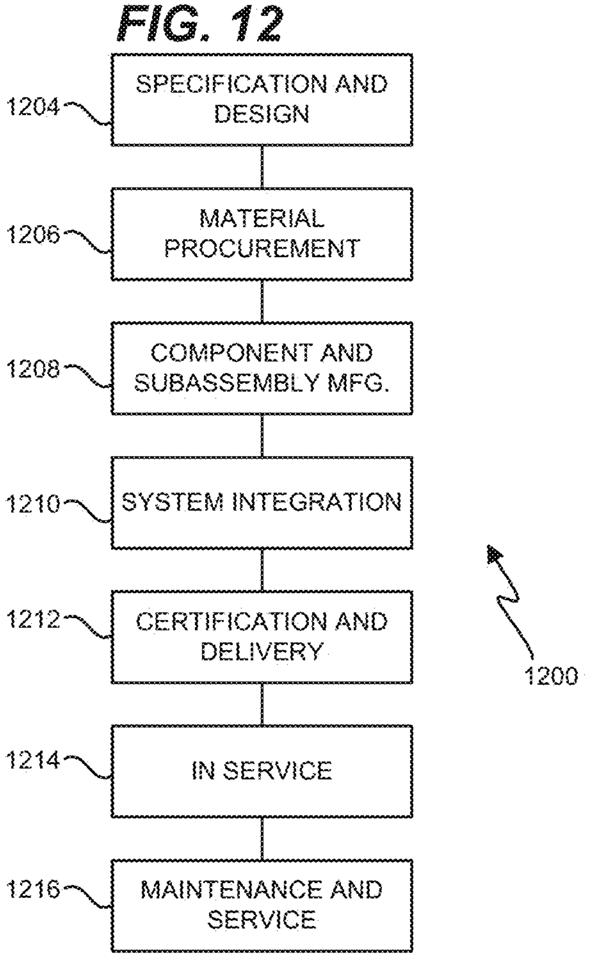
FIG. 12 is a flow diagram of aircraft production and service methodology in an illustrative embodiment.
Figure 13:
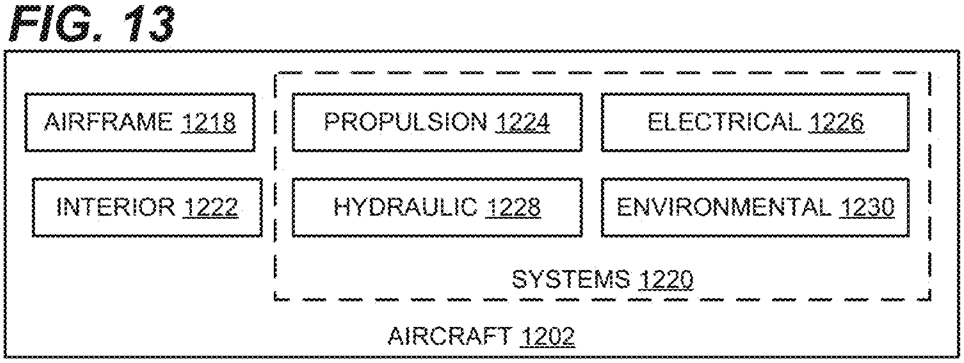
FIG. 13 is a block diagram of an aircraft in an illustrative embodiment.

Referring more particularly to the drawings, embodiments of the disclosure may be described in the context of aircraft manufacturing and service in method 1200 as shown in FIG. 12 and an aircraft 1202 as shown in FIG. 13. FIG. 12 is a flow diagram of aircraft production and service methodology in an illustrative embodiment. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

FIG. 13 is a block diagram of an aircraft in an illustrative embodiment. As shown in FIG. 13, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service 1214. Also, one or more apparatus embodiments, method embodiments, or a combination thereof may be utilized during the component and subassembly manufacturing 1208 and system integration 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. Thus, the invention may be used in any stages discussed herein, or any combination thereof, such as specification and design 1204, material procurement 1206, component and subassembly manufacturing 1208, system integration 1210, certification and delivery 1212, service 1214, maintenance and service 1216 and/or any suitable component of aircraft 1202 (e.g., airframe 1218, systems 1220, interior 1222, propulsion system 1224, electrical system 1226, hydraulic system 1228, and/or environmental 1230).

In one embodiment, a part comprises a portion of airframe 1218, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus for fabrication of a structure, the apparatus comprising:

an indexing unit that is dimensioned for coupling to an indexing feature which is disposed on the structure, the structure proceeding along a process direction during fabrication; and a cutting station disposed at a predetermined offset from the indexing unit.

2. The apparatus of claim 1, wherein:

the cutting station cuts out manufacturing excess from the structure.

3. The apparatus of claim 1, wherein:

the indexing unit is coupled to the indexing feature by aligning the indexing unit with the indexing feature of the structure.

4. The apparatus of claim 1 wherein:

the indexing feature comprises a Radio Frequency Identifier (RFID) chip associated with the structure, and coupling comprises reading the RFID chip.

5. The apparatus of claim 1 wherein:

the indexing feature comprises a Radio Frequency Identifier (RFID) feature associated with the structure, and coupling comprises reading the RFID feature.

6. The apparatus of claim 2 wherein:

the cutting station comprises:

a cutter that cuts the manufacturing excess; and a gripper that supports the cutter during cutting by clamping against the structure as the cutter cuts the manufacturing excess.

7. The apparatus of claim 1 wherein:

the cutting station is configured to index to the structure and cut manufacturing excess from the structure after each of multiple pulses of the structure in the process direction.

8. The apparatus of claim 2, wherein:

the cutting station includes a cutting head comprising:

a blade that cuts the manufacturing excess; and the blade follows a boundary defined by a surround installed at the structure.

9. The apparatus of claim 1 wherein:

the indexing unit indexes to a section of manufacturing excess prior to the cutting station cutting the manufacturing excess.

10. The apparatus of claim 1 further comprising:

a Non-Destructive Inspection (NDI) station that inspects a trim edge of an opening formed by the cutting station.

11. The apparatus of claim 1 further comprising:

a sealing station that seals an opening formed by the cutting station.

12. The apparatus of claim 1 further comprising:

a painting station that paints an opening formed by the cutting station.

13. The apparatus of claim 1 further comprising:

a track that supports the structure as the structure proceeds in the process direction.

14. The apparatus of claim 1 wherein:

the structure comprises a portion of a fuselage of an aircraft, and an opening is selected from the group consisting of: windows, doors, cargo doors, antenna cut-outs, and panels.

15. The apparatus of claim 1 wherein:

the indexing feature is disposed on a manufacturing excess selected from the group consisting of: a window manufacturing excess and a lower edge manufacturing excess of a fuselage.

16. The apparatus of claim 1, further comprising:
a gripper that holds a portion of the structure that is being removed during cutting and disposes the portion of the structure at a chute.

17. The apparatus of claim 1 further comprising:
a controller that operates the cutting station in accordance with a Numerical Control (NC) program.

18. An apparatus comprising:
an indexing unit dimensioned for interacting with Radio Frequency Identifier (RFID) chips on a structure that proceeds along a process direction during assembly; and
a cutting station, disposed at a predetermined offset from the indexing unit, that cuts out manufacturing excess from the structure, resulting in an opening.

19. The apparatus of claim 18 further comprising:
a Non-Destructive Inspection (NDI) station that inspects a trim edge of the opening.

20. The apparatus of claim 18 further comprising:
a sealing station that seals the opening.

* * * * *